United States Patent [19]

Greenspan

[11] Patent Number: 5,517,560
[45] Date of Patent: May 14, 1996

[54] CALL BILLING AND MEASUREMENT METHODS FOR REDIRECTED CALLS

[75] Inventor: Steven L. Greenspan, Oak Park, Ill.

[73] Assignee: AT&T Corp., Murray Hill, N.J.

[21] Appl. No.: 512,609

[22] Filed: Aug. 8, 1995

Related U.S. Application Data

[63] Continuation of Ser. No. 995,655, Dec. 21, 1992, abandoned.

[51] Int. Cl.$^6$ .......................... H04M 15/00; H04M 3/42
[52] U.S. Cl. .......................... 379/114; 379/115; 379/121; 379/201; 379/205; 379/210
[58] Field of Search ..................... 379/111, 112, 379/113, 114, 115, 121, 127, 201, 204, 205, 210, 211, 212, 222, 223

[56] References Cited

U.S. PATENT DOCUMENTS

| | | | |
|---|---|---|---|
| 4,611,094 | 9/1986 | Asmuth et al. | 375/207 X |
| 4,691,347 | 9/1987 | Stanley et al. | 379/204 X |
| 4,788,719 | 11/1988 | Gupta | 379/114 |
| 4,805,209 | 2/1989 | Baker et al. | 379/96 |
| 5,008,930 | 4/1991 | Gawrys et al. | 379/210 |
| 5,048,079 | 9/1991 | Harrington et al. | 379/112 |
| 5,222,120 | 6/1993 | Mcleod et al. | 379/88 |
| 5,247,571 | 9/1993 | Kay et al. | 379/207 |

FOREIGN PATENT DOCUMENTS

425161A2 10/1990 European Pat. Off. .
470415A2 of 1991 European Pat. Off. .

OTHER PUBLICATIONS

A-I-Net™ Service Circuit Node (SCN) System Description, 270-730-010, Issue 1, Apr. 1992.
A-I-Net™ Service Circuit Node (SCN) Product Technical Specifications Release 1, 270-730-011, Issue 1, Apr. 1992.
5ESS® Switch-The Premier Solution, Feature Handbook, 235-390-500, Issue 5, Nov. 1988.
Advertisement in *Wall Street Journal*, dated Nov. 9, 1992, entitled "The FCC Has Ruled that Your 800 Number Will Soon Belong to Someone it Has Never Belonged to Before: You".

Primary Examiner—Stephen Chin
Assistant Examiner—Paul Loomis
Attorney, Agent, or Firm—David L. Hurewitz

[57] ABSTRACT

A call processing and billing method where the two billing records generated for a redirected call are transmitted to the same billing center or to the same network of interconnected billing centers, and where the two billing records are correlated to generate a single billing record for use in billing the call. The method is extensible for calls that are redirected more than once.

17 Claims, 36 Drawing Sheets

CALL BILLING AND MEASUREMENT METHODS FOR REDIRECTED CALLS

This application is a continuation of application Ser. No. 07/995,655, filed on Dec. 21, 1992 now abandoned.

CROSS-REFERENCE TO RELATED APPLICATIONS

This application is related to the following applications, which are assigned to the same assignee and filed of even data:

S. L. Greenspan, U.S. Ser. No. 07/994,556 "Call Transfer with Automatic Return", and M. A. Burd et al., U.S. Ser. No. 07/993,754 now U.S. Pat. No. 5,432,845 "Recurrent Call Prompter and Post Answer Call Redirection".

1. Technical Field

This invention relates to telecommuncations.

2. Background of the Invention

As stored program controlled switching systems have evolved, a wide variety of useful features have been developed to extend the communication capabilities such systems provide. One class of features relates to redirecting calls. Refer to FIG. 33 and consider an example where a customer at a calling station (1stStation) calls a business using an 800 number and the call is answered at a general customer representative's station (2nd station). The representative and the customer talk for a few minutes and the representative determines that the customer should talk to a specialist employed by the same business but located in another city. The representative then transfers the call to the specialist's station (3rdStation) and disconnects from the call. Assume that the three stations are served by three different switches 110, 120, 130. In present day practice, switch 110 serving the customer's station (1stStation) generates a first billing record in billing subsystem 141 which includes both the time that the customer and representative talk as well as the time that the customer and the specialist talk (FIG. 37). Switch 120 serving the representative's station (2nd station) generates a second billing record in billing subsystem 142 which includes the time that the customer and the specialist talk (FIG. 37). Assume, for example, that switches 110 and 120 are connected to billing centers 161 and 162 respectively. The first and second billing records are transmitted to billing centers 161 and 162, respectively, and two separate bills are generated. The first bill may be for twelve minutes and the second bill for ten minutes, a total of 22 minutes, even though the caller was only talking for twelve minutes. This arrangement provides no flexibility in billing calls involving call redirection.

SOLUTION

This problem is solved and a technical advance is achieved in accordance with the principles of the invention in an illustrative method where the two billing records generated for a redirected call are transmitted to the same billing center or to the same network of interconnected billing centers, and where the two billing records are advantageously correlated to generate a single billing record for use in billing the call. In the above examplary call scenario, a single bill for twelve minutes may be generated. The method is extensible for calls that are redirected more than once. The single bill may alternatively reflect other discounting plans. In an alternative method referred to and described herein as Service 4, call history information is transferred and updated to follow a call as it is redirected. The updated information is used in billing the redirected call, providing measurements concerning the redirected call, and in controlling the call, for example when the call is subsequently returned to the station that initiated a transfer. The alternative method is also extensible for calls that are redirected more than once.

A call processing and billing method in accordance with the invention includes connecting a call from a first station to a second station. Contemporaneously with connecting the call to the second station, a first billing record for the call is initiated. The call is then connected to a third station. Contemporaneously with connecting the call to the third station, a second billing record for the call is initiated. The first and second billing records are completed proximate to the end of the call. After the billing records are completed, they are correlated to generate a single billing record for use in billing the call.

The invention is used in an illustrative service described herein and referred to as Service 5. The invention is also used in three illustrative services described herein and referred to as Services 1, 2, and 3, each of which also involves a switch having a new, transfer-with-automatic-return feature.

The connection of the call to the third station may involve conferencing the third station into the call, or transferring the call to the third station. A call transfer is effected in one of three ways: blind transfer, consultation, or conference. With blind transfer, one of the first and second stations is not connected to the third station for an initial two-way consultation before the other of the first and second stations is connected to the third station. With consultation, the one station and the third station are connected for an initial two-way consultation and thereafter the other station and the third station are connected. With conference, the one station, the other station, and the third station are initially connected for a conference and the one station subsequently drops out.

Illustratively, the correlation comprises modifying one of the billing records based on the other. Alternatively, information from the two billing records is in some fashion combined to generate a single billing record. Further, the two billing records may be compared and only one of them used, either unaltered or with some modification, as the single billing record. An identifier, e.g., a flag or other identifier, is included in either one or both of the first and second billing records for use in the correlation. Rather than having a billing center perform the correlation, the two billing records may be correlated by a switching system, e.g., a system serving one of the stations involved in the redirected call.

As a further example, the first bill may be completed proximate to the call redirection.

A further alternative method used in the arrangement of FIG. 40 includes connecting a call from a first station to a second station. Contemporaneously with connecting the call to the second station, the transmission of first call segment event messages is initiated to a billing center, e.g., a nationwide billing center. The call is then connected to a third station. Contemporaneously with connecting the call to the third station, the transmission of second call segment event messages is iniatiated to the same billing center. After all of the first and second call segment event messages have been transmitted, the billing center correlates them to generate a single billing record for use in billing the call.

DRAWING DESCRIPTION

Figure 32:
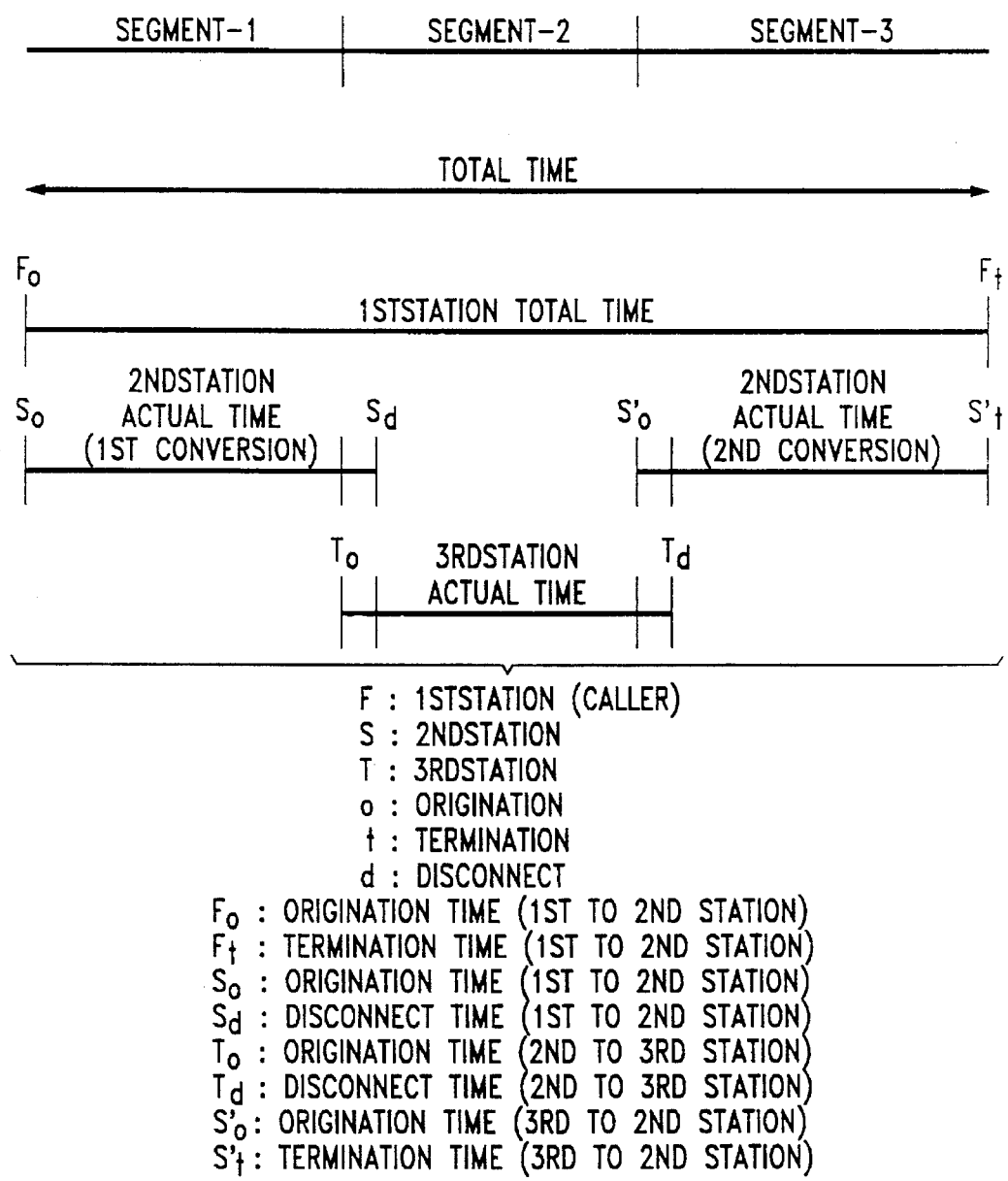
Figure 33:
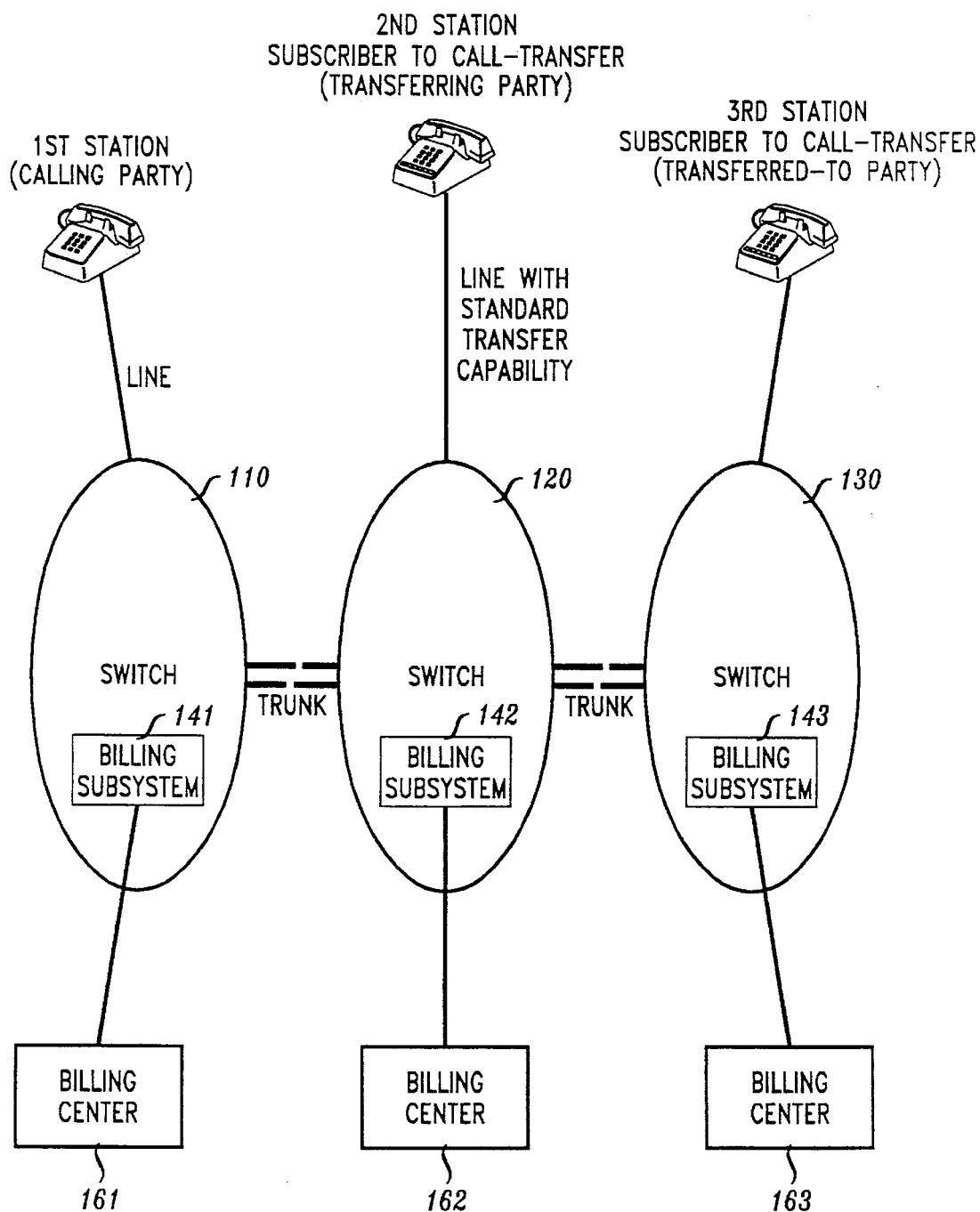
Figure 34:
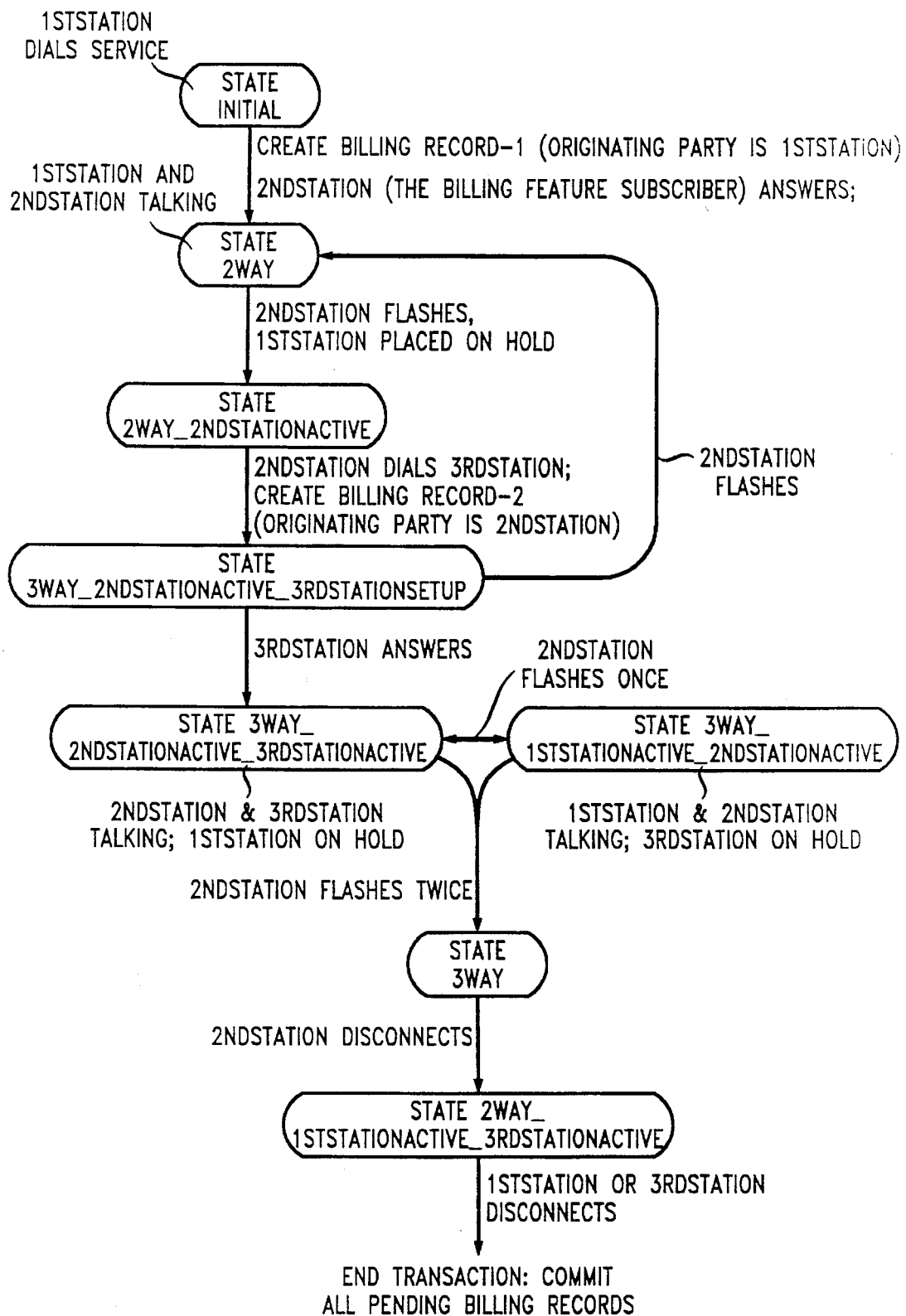
Figure 35:
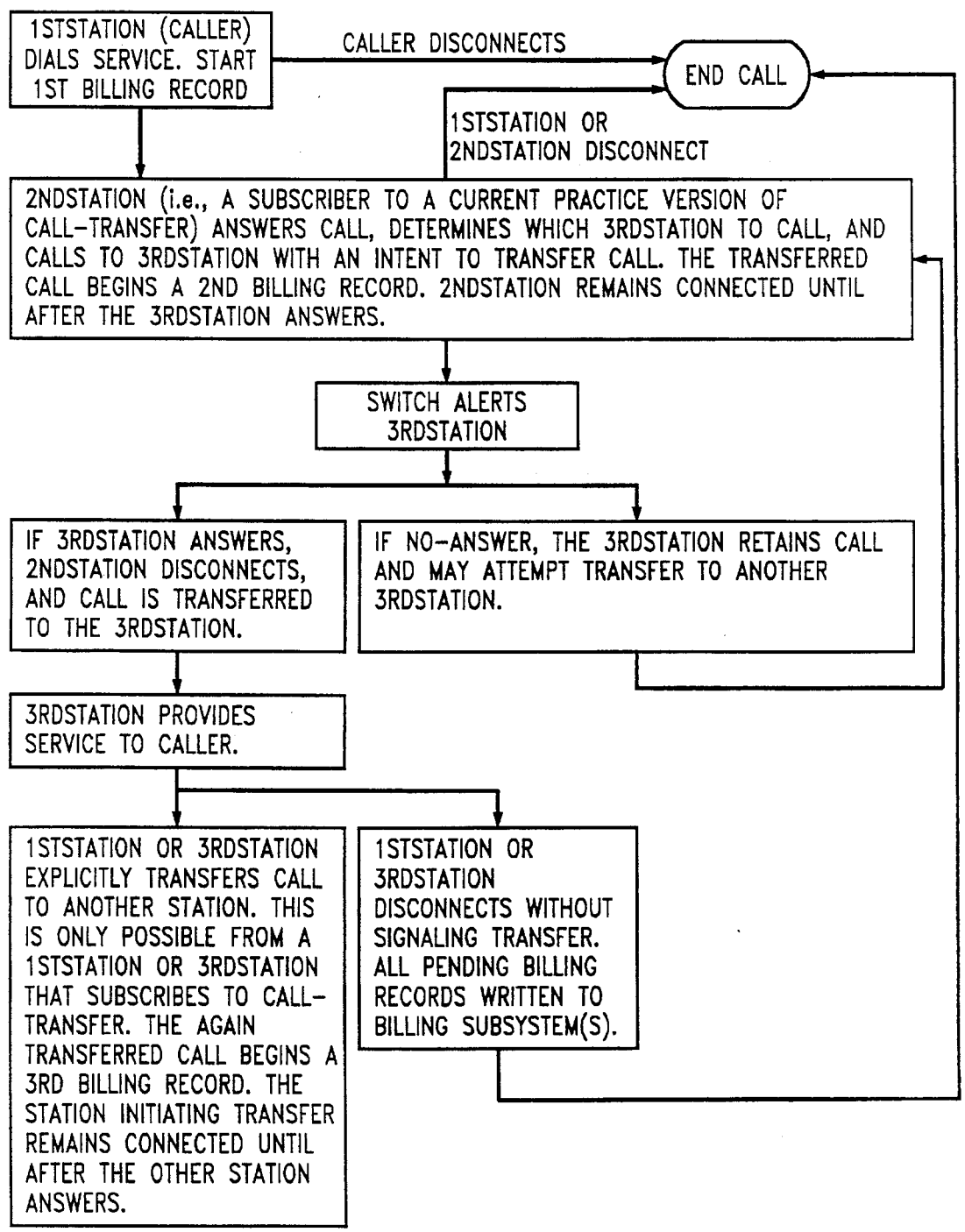
Figure 36:
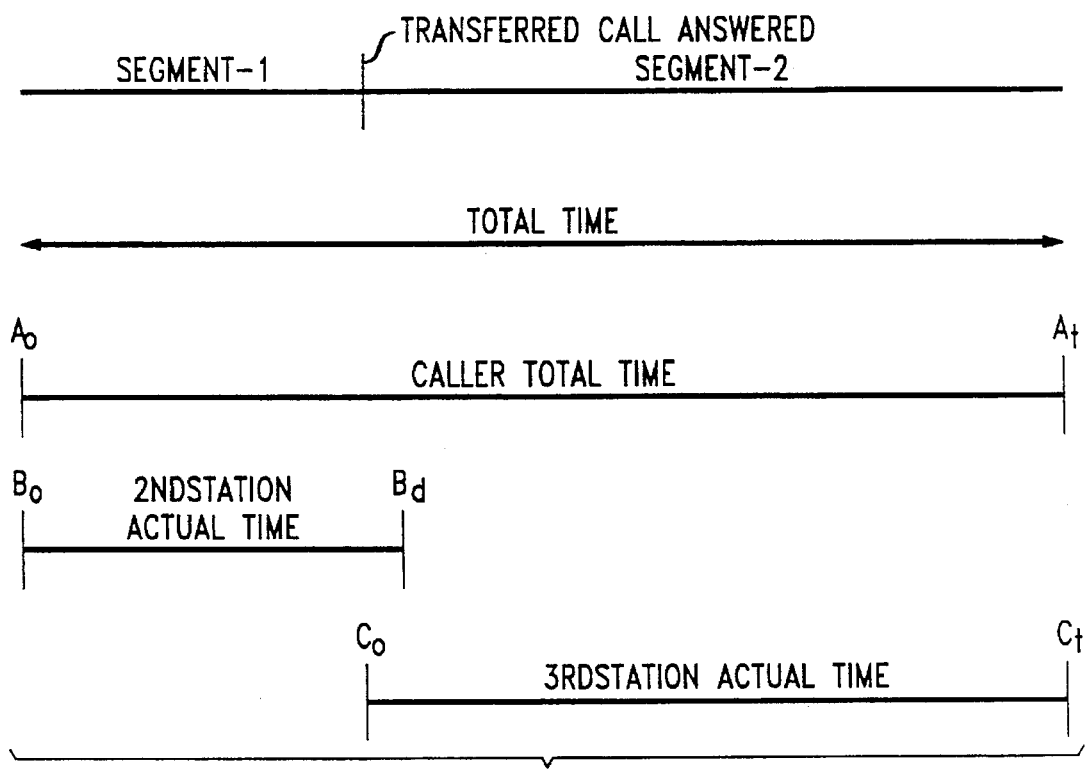
Figure 37:
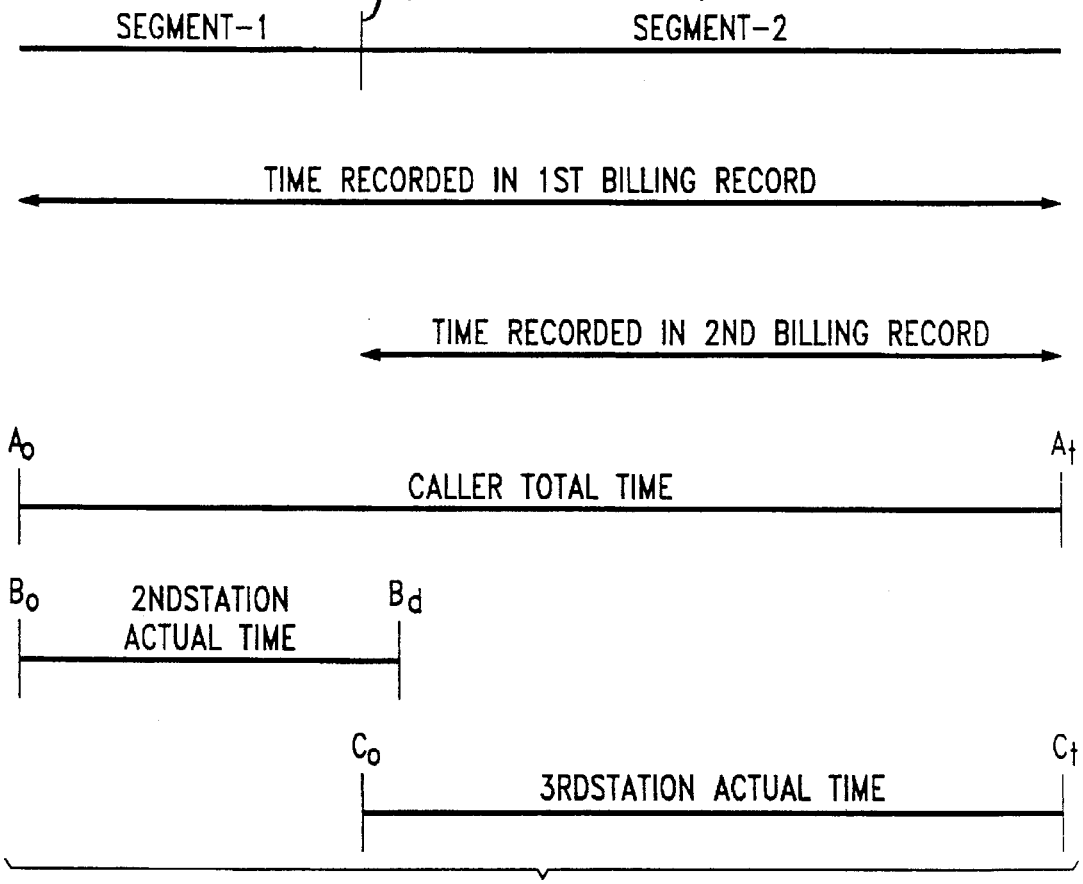
Figure 38:
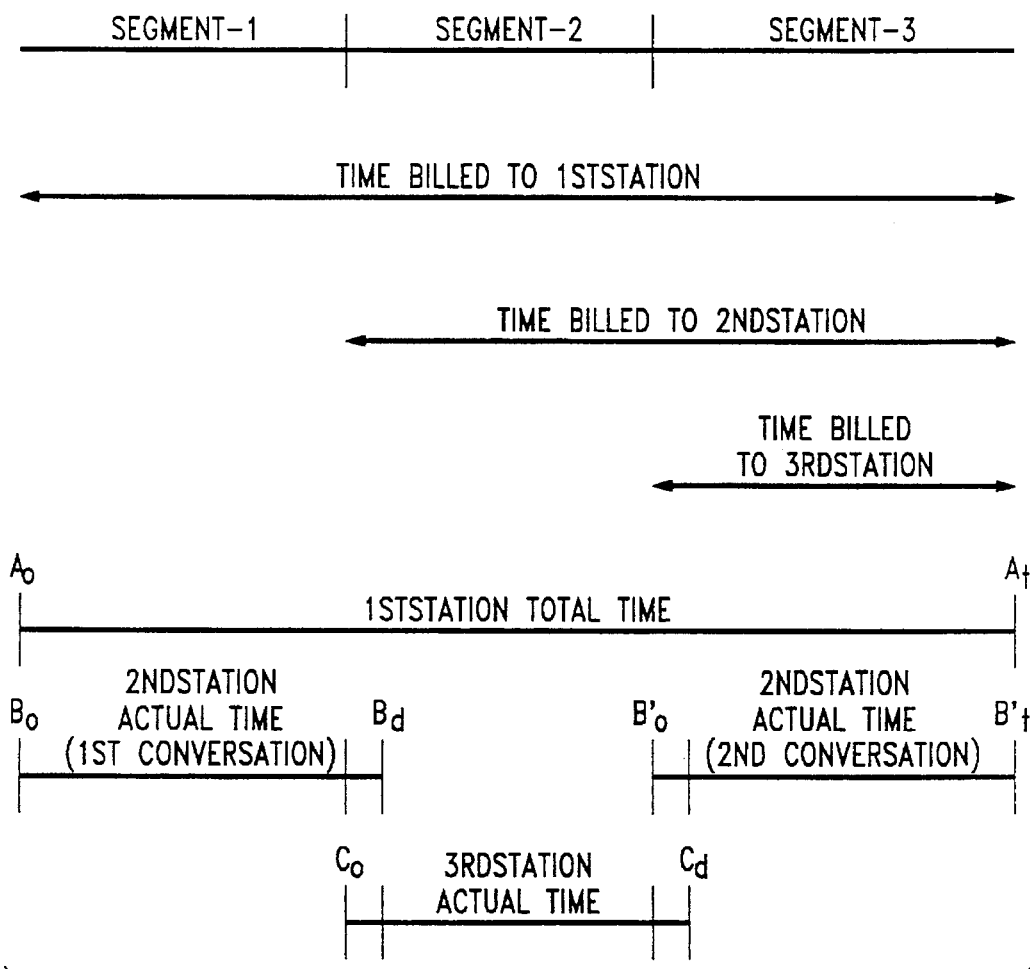
Figure 39:
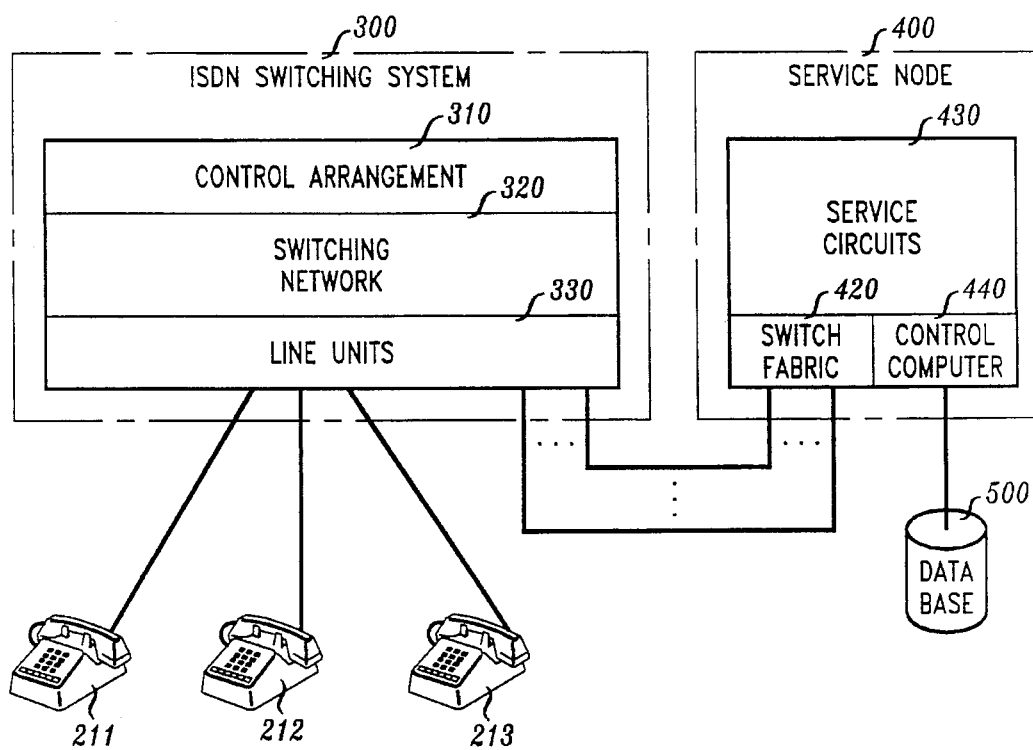
Figure 40:
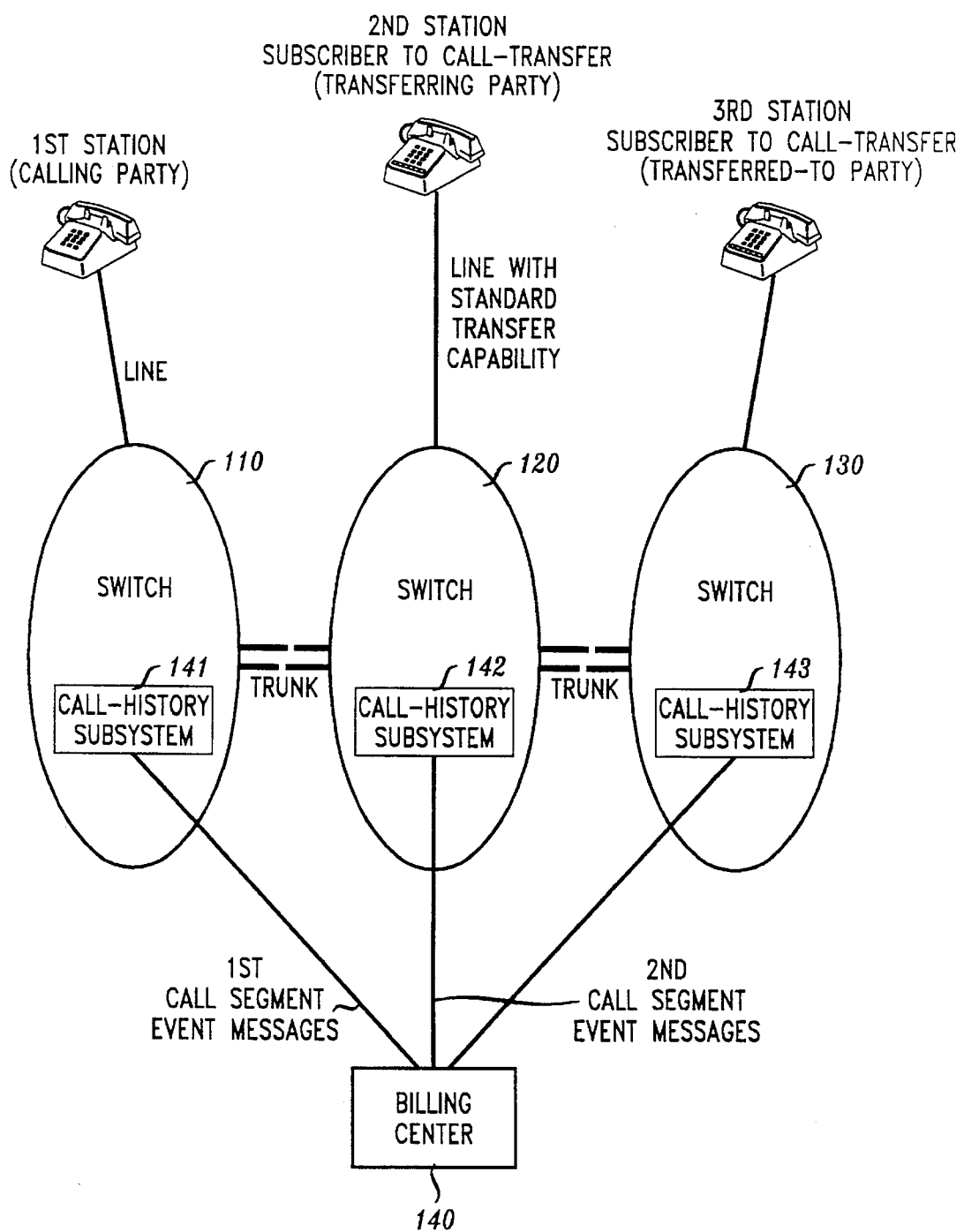

FIG. 32 in an event timing diagram for Scenario B;

FIG. 33 is a hardware diagram for an arrangement that implements a prior art billing service;

FIG. 34 is a state diagram summarizing transitions between a number of states used to implement the prior art service;

FIG. 35 is a call flow diagram for the prior art service;

FIGS. 36–37 are event timing diagrams for Scenario A with the prior art service;

FIG. 38 is an event timing diagram for Scenario B with the prior art service;

FIG. 39 is a hardware diagram of a host switching system and a switch adjunct, e.g., a service circuit node described herein; and FIG. 40 is a hardware diagram for an arrangement that implements a new, alternative billing method.

DETAILED DESCRIPTION

Terminology

The terms, 1stStation, 2ndStation, and 3rdStation are used herein to refer to stations of a calling party, called (and transferring) party, and transferred-to party, respectively. The 1stStation originates a call to a 2ndStation, which in turn transfers the call to a 3rdStation, establishing a talking path between the 1stStation and the 3rdStation. The services described herein also apply to cases where a 1stStation originates a call to a 2ndStation, the 1stStation transfers the call to a 3rdStation, establishing a talking path between the 2ndStation and the 3rdStation. The transferring station is also referred to as one of the first and second stations while the non-transferring station is referred to as the other of the first and second stations.

The terms 1stStation, 2ndStation, and 3rdStation should be read broadly as referring to customer and network equipment, telephones, computers, PBXs, and network and third-party switch adjuncts.

Services

The following description relates to five new telephone services:

Service 1: Attendant Service with Transfer-with-Return

In this service description, transfer-with-return and call-history features are illustrated in the context of a service center, in which customers (1stStations) call an attendant (2ndStations), who in turn can transfer the call to service specialists (3rdStations). Upon some designated signal (e.g., a flash, DTMF, or disconnect from the 1stStation or 3rdStation) the 1stStation and/or 3rdStation are reconnected to the 2ndStation.

Service 2: SCN use of Transfer-with-Return feature so that SCN can be information gateway In this service description, the notion of an attendant (2ndStation) is generalized to include switching adjuncts, in this case, a Service Circuit Node (SCN) that can invoke the transfer-with-return and call-history features on a host switch. In such a case, the SCN is able to establish independent call legs from or to a 1stStation and a 3rdStation (the SCN acts as the 2ndStation), to apply a variety of service circuits (e.g., announcements, facsimile, and conference facilities), and to transfer the two call legs back to the host switch, so that the SCN is no longer pan of the talking path between the 1stStation and 2ndStation. Upon some designated signal (e.g., a flash, DTMF, or disconnect from the 1stStation or 3rdStation) the 1stStation and/or 3rdStation are reconnected to the 2ndStation as a conference of 1st, 2nd, and 3rdStations or two call paths—a communication path between the 1st and 2ndStations and an independent communication path between the 2nd and 3rdStations.

Service 3: ESM use of Transfer-with-Return feature so that ESM can be information & service circuit gateway In this service, a service circuit node (SCN) is generalized to less powerful service adjuncts or CPE, e.g., automated telecommunications systems referred to herein as external service modules (ESMs).

Service 4: Service gateway without switch-based transfer-with-return capability

In this service, a transfer-with-return sequence (1stStation calls 2ndStation that transfers call to 3rdStation that, in turn, transfers call back to 2ndStation) is accomplished without the transfer-with-return feature. Call history information is transferred and updated (either by the stations or the associated switches) as the call is successively transferred. The information is usable in billing the call, generating measurements for the call, and/or controlling the call.

Service 5: Correlated billing records for call transfer sequences

In this service, a first billing record is initiated when a call is connected from a 1stStation to a 2ndStation. A second billing record is initiated when the call is connected to a 3rdStation. The first and second billing records are completed before or proximate to the end of the call and are transmitted to a billing center or network of interconnected billing centers where they are correlated to generate a single billing record for billing the call.

Service 1: Attendant Service with
Transfer-with-Return

These features are used by a group of 2ndStations (e.g., a group of service attendants) to transfer calls to service agents who specialize in a particular area, and to then have the call transferred back to them for service follow-ups, quality audits, etc. Four sets of features are identified:

transfer-with-return feature
return transfer triggers, in particular a call termination trigger
call-history feature
call-termination notification Feature Descriptions:

A) Transfer with Return

This feature allows a subscribing attendant (a 2ndStation) to transfer a call (from a 1stStation) to a 3rdStation, allowing a talking path between the 1st and 3rd Stations and allowing the 2ndStation to disconnect from the call. However, following the disconnection by the 2ndStation, the 1stStation and 3rdStation are reconnected to the 2ndStation, if the 1st or 3rdStation signals appropriately; or the 1stStation or 3rdStation are reconnected to the 2ndStation, if the 3rdStation or 1stStation disconnects.

The feature works as a line-subscribed feature, that can be invoked on a per-call basis or automatically invoked on all calls. If subscribed to on a per-call basis, the attendant (2ndStation) may signal transfer with no return, transfer with return, or other subscribed to attendant features, e.g., conference, hold, etc. If the attendant is part of a multi-line hunt or ACD group, the return-transfer is made to the attendant that initially handled the call. If the attendant is busy, the call is forwarded to an appropriate co-worker.

B) Return Transfer Triggers

Reconnection to the 2ndStation is triggered in several ways: disconnection by the 1st or 3rd Station, and signaling (e.g., flash or DTMF) by the 1st or 3rdStation. If the feature allows the 1stStations or 3rdStations to signal (e.g., flash or DTMF) reconnection to the attendant, then the transfer-with-return feature works in conjunction with 3-way calling. The 2ndStation could drop out of the conference and then be asked to come back into the conference. In some cases, a 3rdStation may be an automated service module, e.g., a mail system. To permit the 1stStation to signal a return to the 2ndStation while disconnecting the 3rdStation, a call-termination trigger is needed.

C) Call-History Feature on Returned Transfer

So that the 2ndStation (the service attendant) knows that the call is a previously handled call, and so that the 2ndStation is able to quickly identify which call is being returned, the transfer-with-return feature provides call-history and call identification information in the call-setup message. It also provides a reason message that specifies the reason for the return, e.g., 3rdStation disconnected, 1stStation request, etc.

D) Call-Termination Notification

In some call scenarios, both the 1st and 3rd Stations might disconnect before either is reconnected to the 2ndStation. In such cases, the 2ndStation (the service attendant) might still be interested in the call history between the 1st and 3rd Stations. Thus, the feature permits the attendant to specify (perhaps during service subscription) whether or not they should be notified if the caller and the called party both drop the call.

Figure 2:
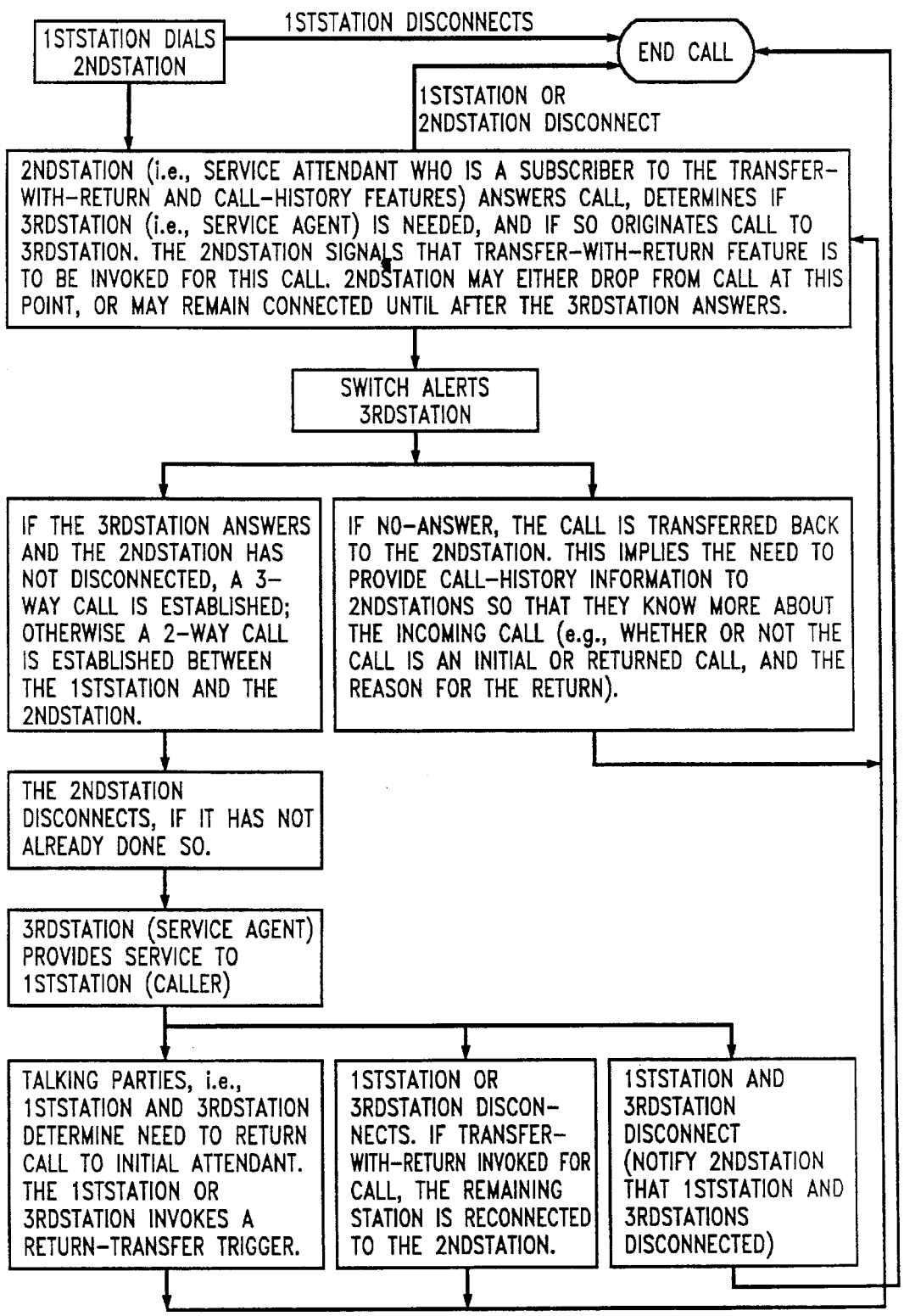
FIG. 2 is a call flow diagram for Service 1.

Note that in the call flow of FIG. 2, the 2ndStation(the attendant) places the 1stStation (the caller) on hold; originates a call to a 3rdStation (e.g., a service agent); conferences together the three stations; and finally disconnects the 2ndStation, leaving a talking path between the 1st and 3rd Stations. The service concept also applies to other call flows. In particular, the 2ndStation could disconnect as soon as the call to the 3rdStation is set up but not answered, thus leaving the 1st and 3rdStations in a tinging state. Further, the 2ndStation could connect to the 3rdStation for two-way consultation prior to connecting the 1stStation and 3rdStation.

Figure 1:
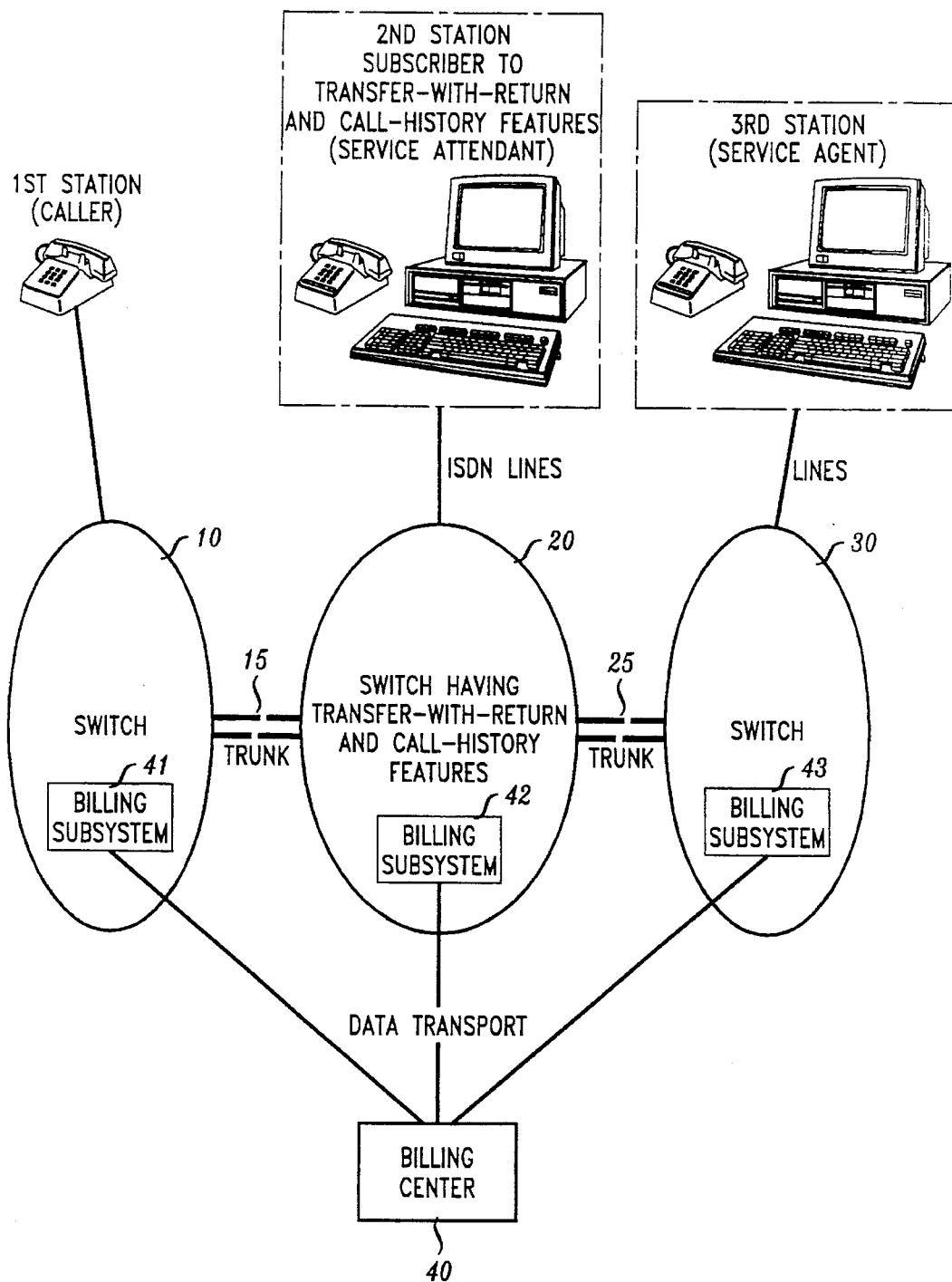
FIG. 1 is a hardware diagram for an arrangement where Service 1 described herein is implemented.

FIG. 1 is a diagram of an exemplary network configuration. The 1stStation, 2ndStation and 3rdStation are connected to switches 10, 20, and 30, respectively. Switches 10 and 20 and switches 20 and 30 are interconnected by trunks 15 and 25, respectively, which may include intermediate switches. Billing center 40 and billing subsystems 41, 42, and 43 are discussed later herein with respect to Service 5.

Figure 10:
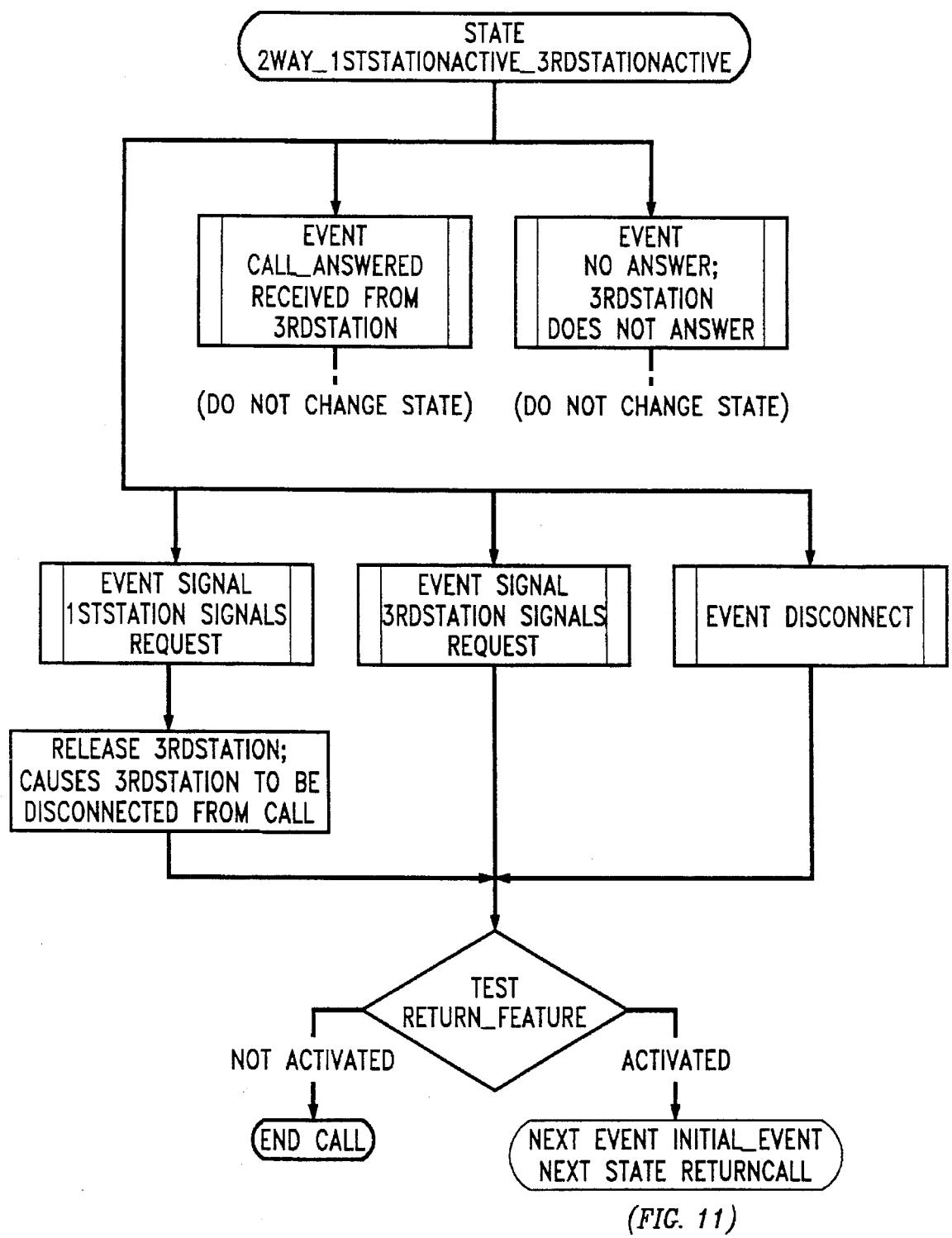
Figure 11:
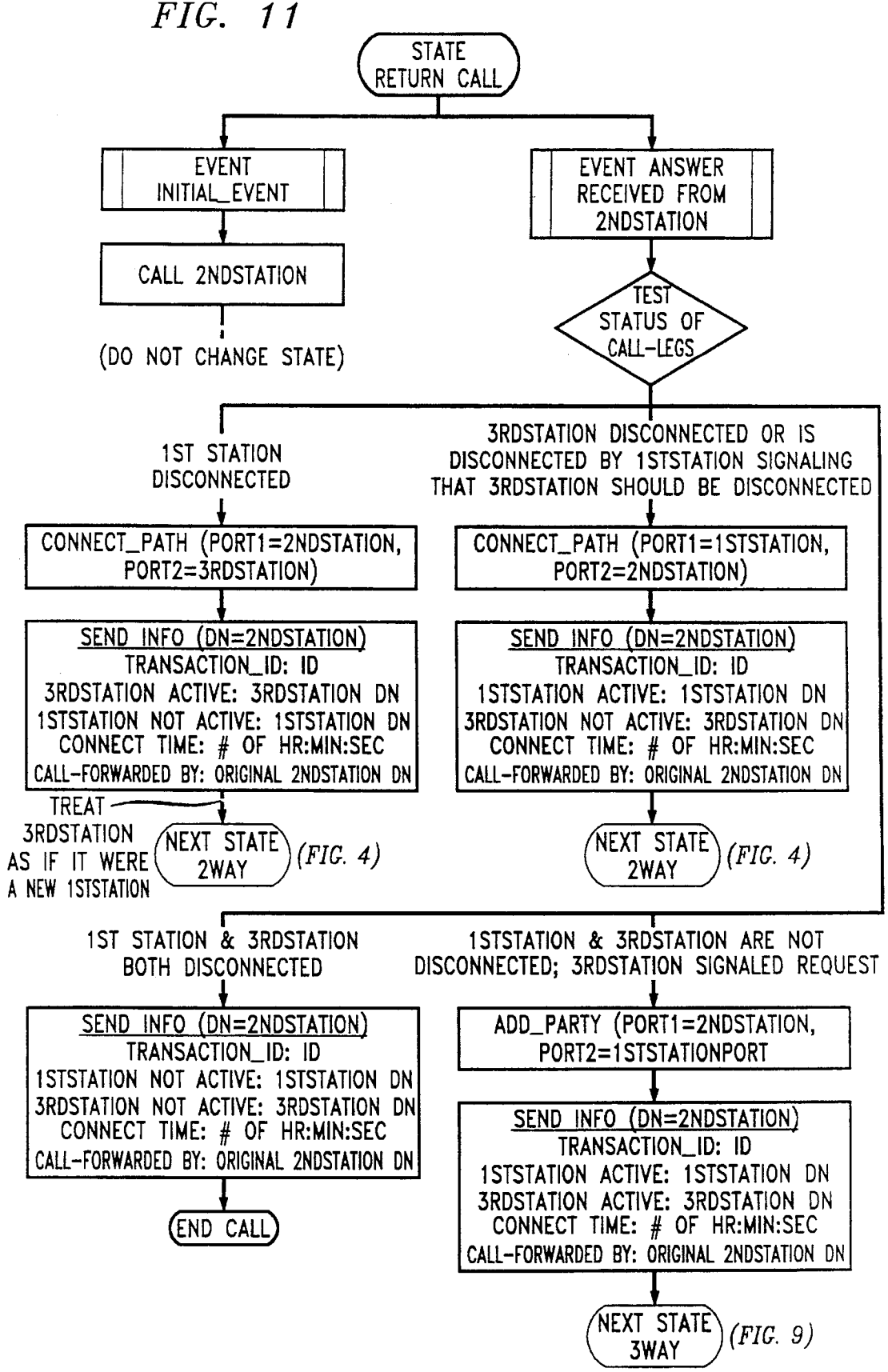
Figure 12:
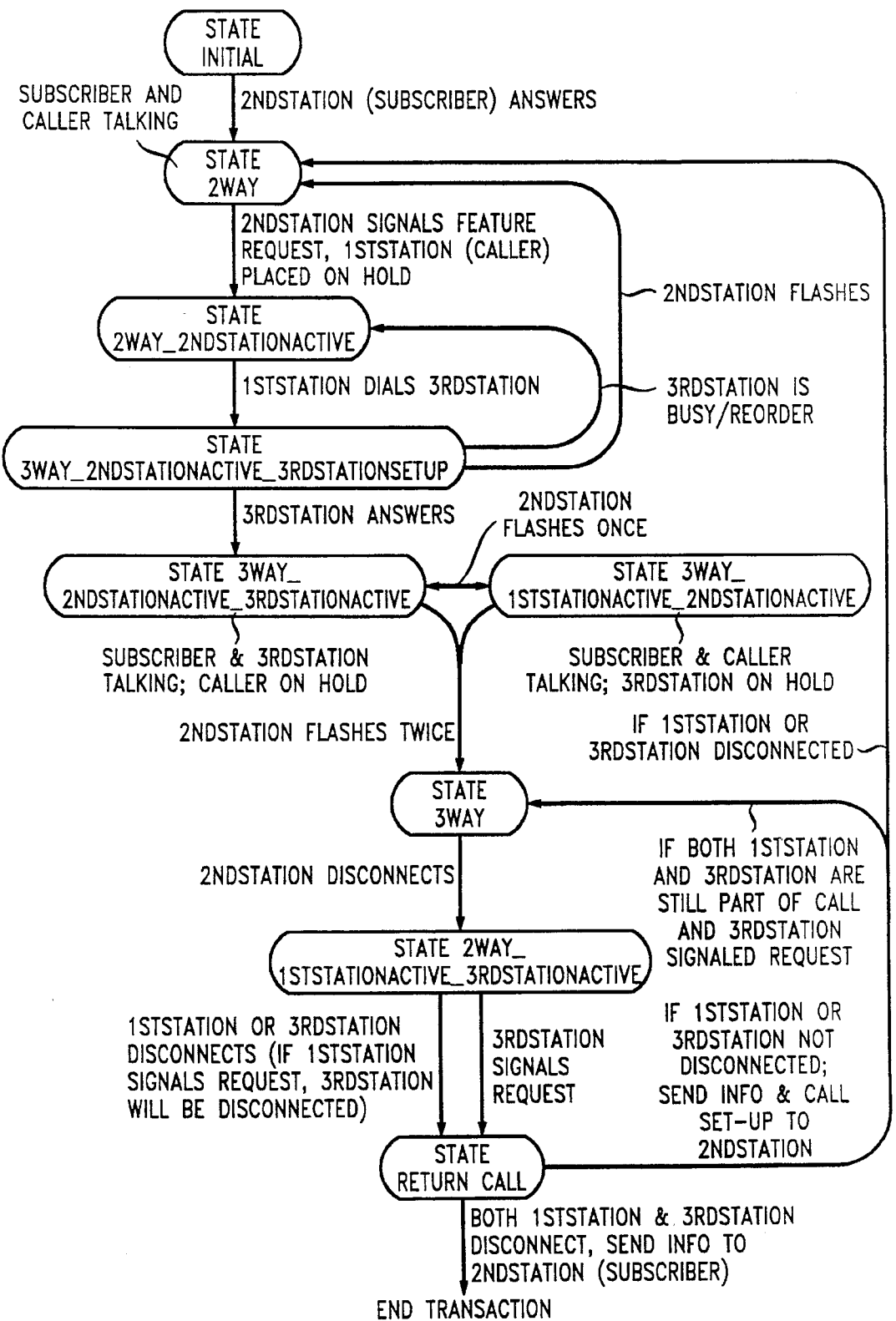
FIGS. 12 is a state diagram summarizing transitions between the states of FIGS. 3–11.

FIGS. 3–11 provide a state chart of how the call-with-return and call-history features operate within switching system 20 for Service 1. FIG. 12 provides a summary of the state transitions.

To improve readability, the following descriptions are partitioned by state. The notation for each state title should be read as: service concept number-state number, state name, e.g., 1-1. state Initial, indicates that Initial is the name of the first state in the state model describing service 1.

Figure 3:
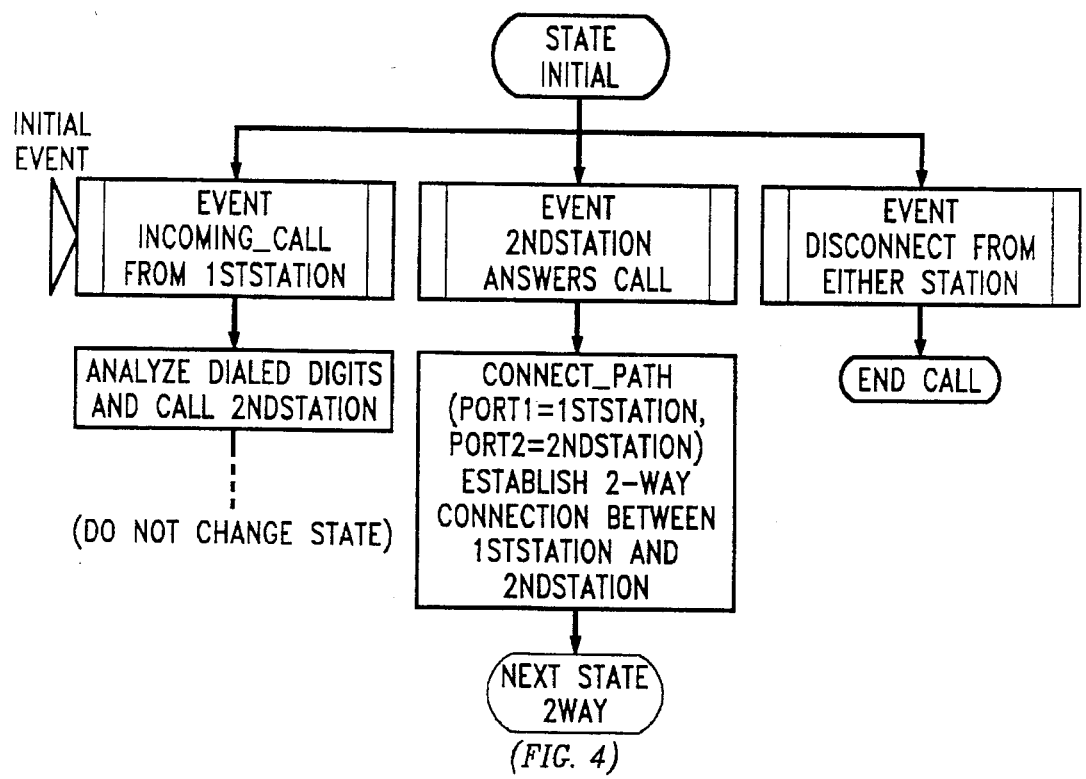
FIGS. 3–11 are action-event diagrams for a number of states used to implement the call flow for Service 1.

1-1. State Initial (FIG. 3)

The call flow begins in the state Initial, with the initial event, Incoming_call. This initial event initiates call processing.

The first action taken in this state is to translate the digits dialed by the 1stStation (i.e., the caller) into a specific directory number, and to then initiate a call-setup to the 2ndStation represented by the dialed directory number.

If the call to the 2ndStation is answered (i.e., an event answered is received from the 2ndStation), then connect 1st and 2nd Stations and transition the state model to another state, 2way.

If the event disconnect is received from either station, then the call ends.

Figure 4:
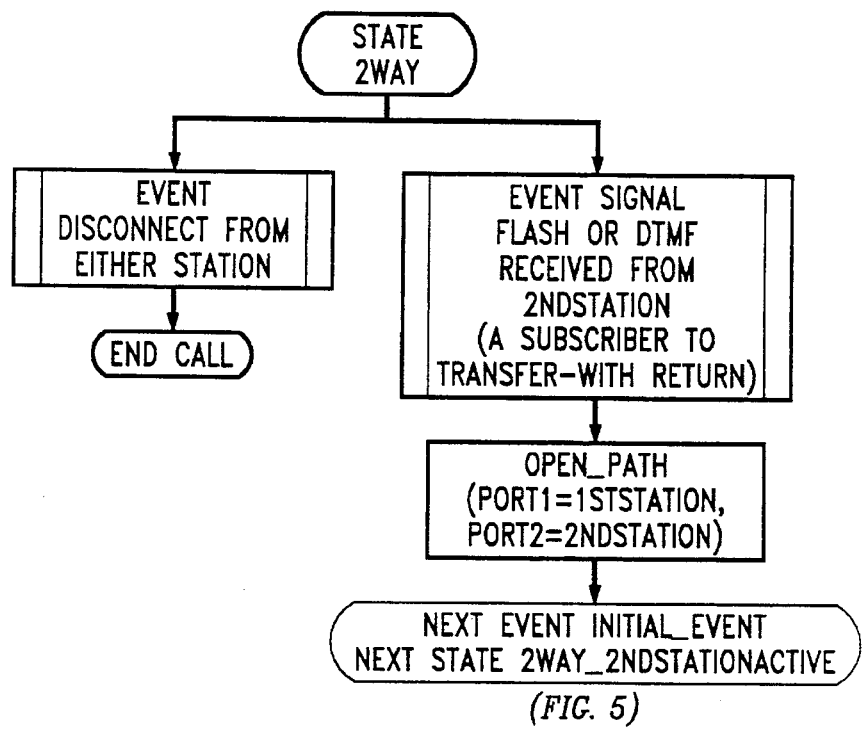

1-2. State 2way (FIG. 4)

If the event disconnect is received from either station, then the call ends.

If the 2ndStation sends an appropriate signal (e.g., a flash or DTMF), and the 2ndStation is a subscriber to the transfer-with-return feature, then place the 1stStation on hold, and transition the state model to another state, 2way_2ndStationActive.

Figure 5:
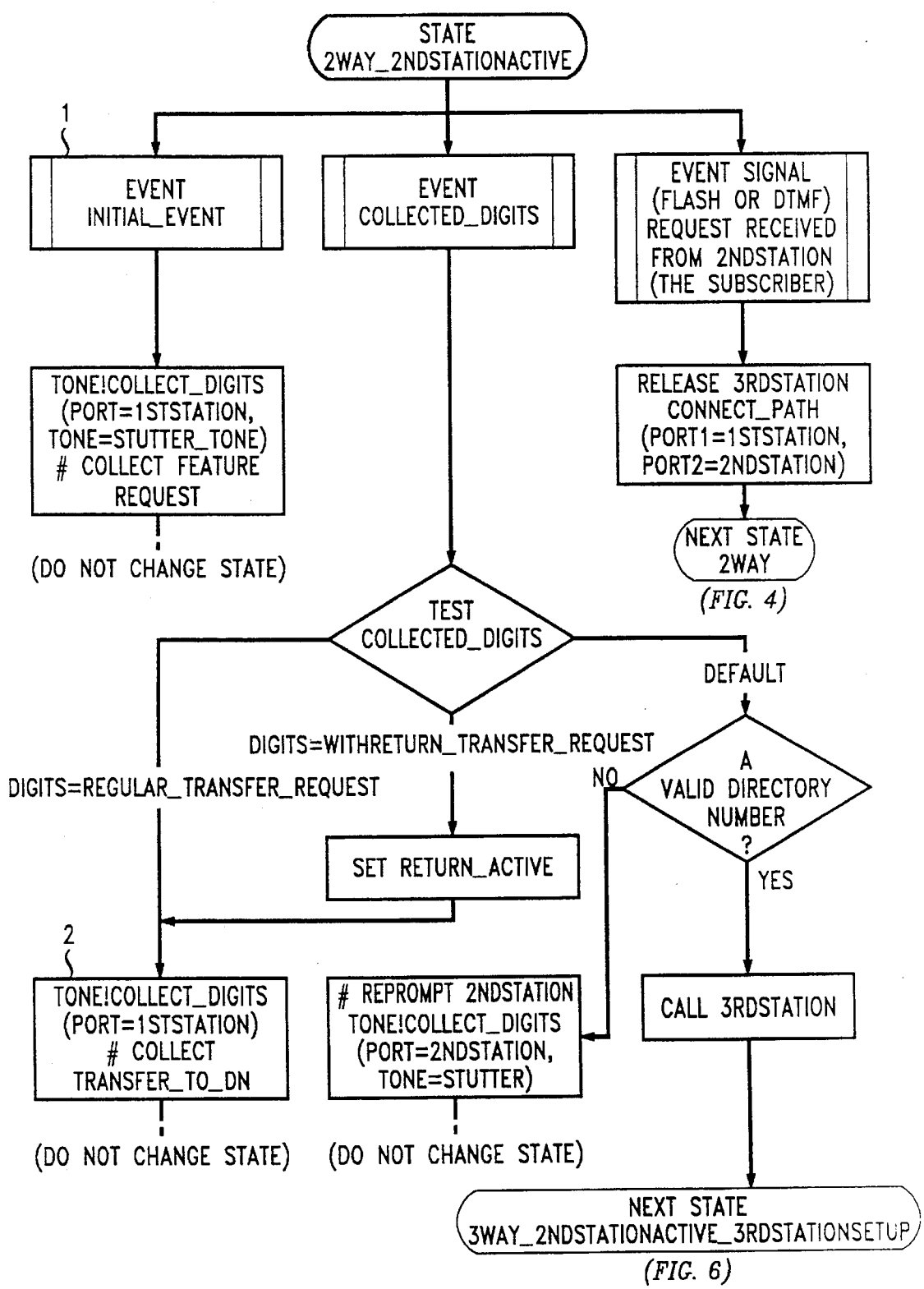

1-3. State 2way 2ndStationActive (FIG. 5)

The 1stStation (caller) is on hold.

Several events are possible in this state:
event Initial Event

The state begins by processing the internally generated event, Initial_Event. Processing this event results in a tone!collect_digits action that delivers a stuttered tone to the 2ndStation. The stuttered tone prompts the 2ndStation for a feature code, one of which is transfer-with-return, another is transfer-without-return (i.e., call-transfer as it is currently done).
event collected digits The digits signaled by the 2ndStation are received as the event collected_digits. If the collected digits indicate a request for transfer-with-return, a Return_active indicator is set to true. If the transfer-with-return or -without-return feature is requested, then a second tone!collect_digits action delivers dial tone to the 2ndStation. The dial tone prompts the 2ndStation for a directory number. If a valid directory number is received from the 2ndStation, a call-setup procedure is invoked and the state model then transitions to a new state, 3way_2ndStationActive_3rdStationSetUp event signal If the appropriate signal (e.g., a flash) is received by the switch from the 2ndStation, the call is returned to the previous 2-way talking path between the 1stStation and 2ndStation, and state model transitions back to the state 2way.

NOTE: the feature may be implemented so that indicating a request for starting transfer procedures is implied by the 2ndStations's (i.e., the subscriber's) initial feature request (flash or DTMF). In this case, call flow would proceed directly from points (1) to (2) in FIG. 5.

Figure 6:
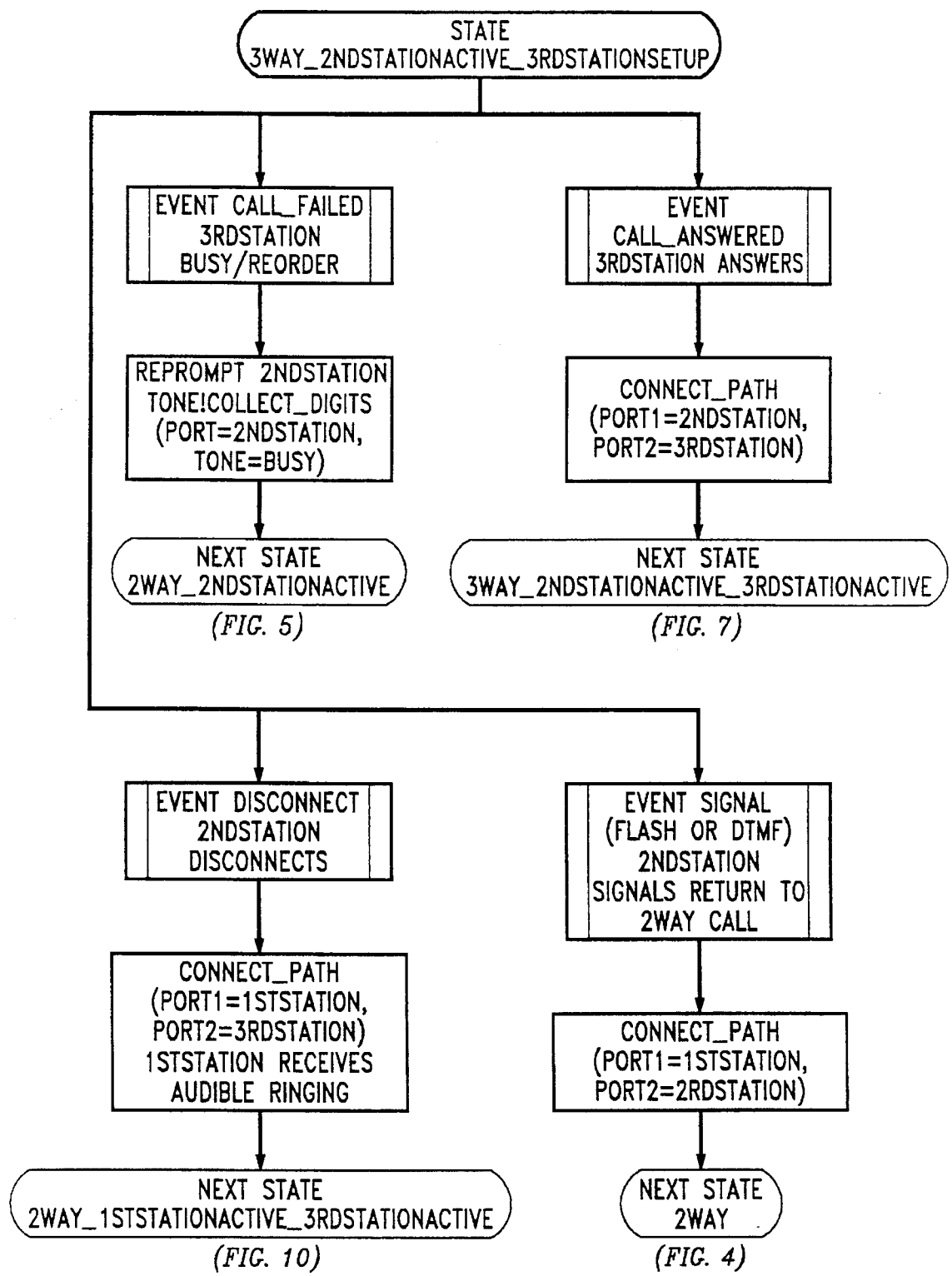

1-4. State 3way 2ndStationActive 3rdStationSetUp (FIG. 6)

The 1stStation is on hold, and the 2ndStation has initiated transfer procedures. Several events are possible in this state:
event call failed The call could not be connected to the designated directory number, perhaps because the 3rdStation was busy or did not answer. In this event, busy or ringing (as appropriate) is delivered to the 2ndStation. The state model then transitions to state 2way__2ndStationActive.
event call answered The 3rdStation answers the call. In this case, the switch establishes a 2-way path between the 2nd and 3rd stations. The state model then transitions to an new state, 3way__2ndStationActive__3rdStationActive.
event disconnect received from 2ndStation The 2ndStation disconnects. In this event, the switch establishes a 2-way connection between the 1stStation and the 3rdStation. Since the 3rdStation has not yet answered, the 1stStation receives audible tinging. The state model then transitions to an new state, 2way__1stStationActive__3rdStationActive.
event signal received from 2ndStation The 2ndStation (the subscriber) signals (typically, but not necessarily, by flashing) a request to return to the 2-way call with the 1stStation. In this event, a talking path is established between the 1st and 2nd stations, and the state model transitions back to the state 2way.

In the next two states, the 2ndStation has a two-way conversation with either the 1stStation or the 3rdStation. The 2ndStation's signal (flash or DTMF) acts a toggle between these two states. If the 2ndStation signals a conference request, procedures for a 3-way conversation are initiated.

Figure 7:
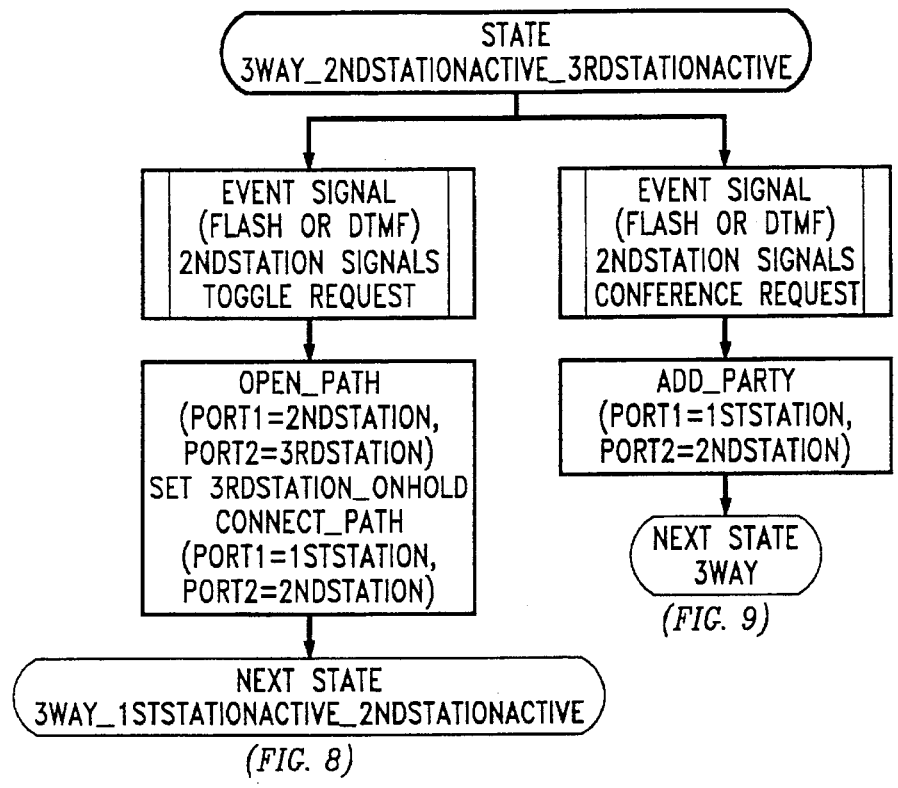

1-5. State 3way 2ndStationActive 3rdStationActive (FIG. 7)

In this state the 1stStation is on hold, while the 2nd and 3rd Stations are connected in a talking path. Two events are significant in this state:
event signal for toggle received from 2ndStation If the 2ndStation signals a single flash (or some DTMF equivalent) then the switch opens the path between the 2nd and 3rd Stations, and connects a path between the 1st and 2nd Stations. The state model then transitions to a new state 3way__1stStationActive__2ndStationActive.
event signal for conference received from 2ndStation If the 2ndStation signals a double-flash (or some DTMF equivalent) then the switch creates a 3-way call between the 1st, 2nd, and 3rd Stations. The state model then transitions to a new state 3way.

Figure 8:
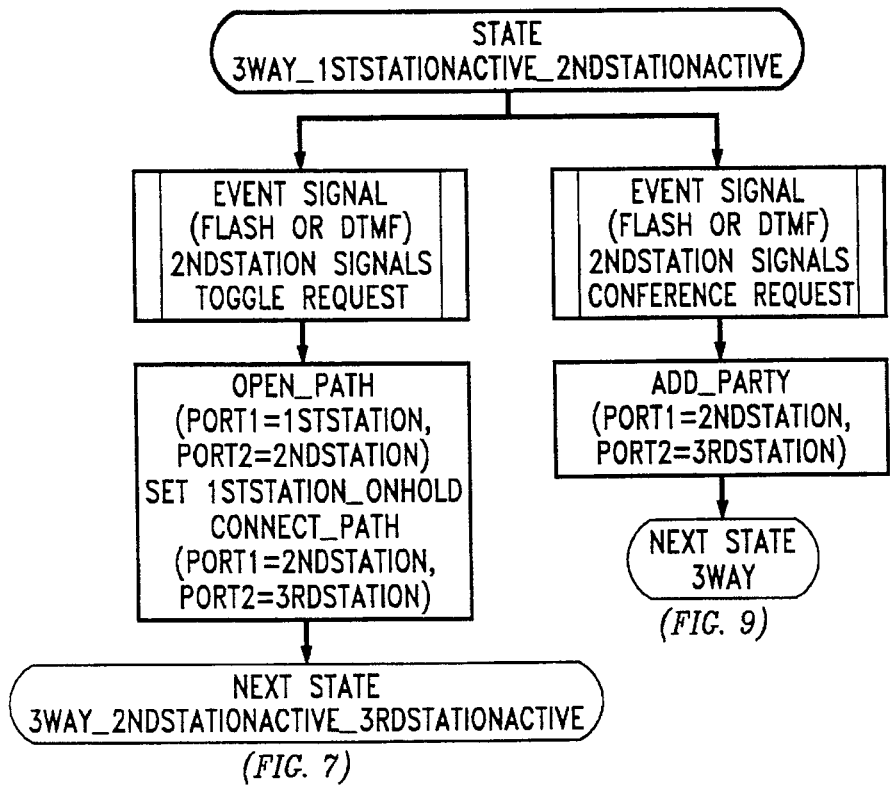

1-6. state 3way 1stStationActive 2ndStationActive (FIG. 8)

In this state the 3rdStation is on hold, while the 1st and 2nd Stations are connected in a talking path. Two events are significant in this state:
event signal for toggle received from 2ndStation If the 2ndStation signals a single flash (or some DTMF equivalent) then the switch opens the path between the 1st and 2nd Stations, and connects a path between the 2nd and 3rd Stations. The state model then transitions back to the state 3way__2ndStationActive__3rdStationActive.
event signal for conference received from 2ndStation If the 2ndStation signals a double-flash (or some DTMF equivalent) then the switch creates a 3-way call between the 1st, 2nd, and 3rd Stations. The state model then transitions to a new state 3way.

Figure 9:
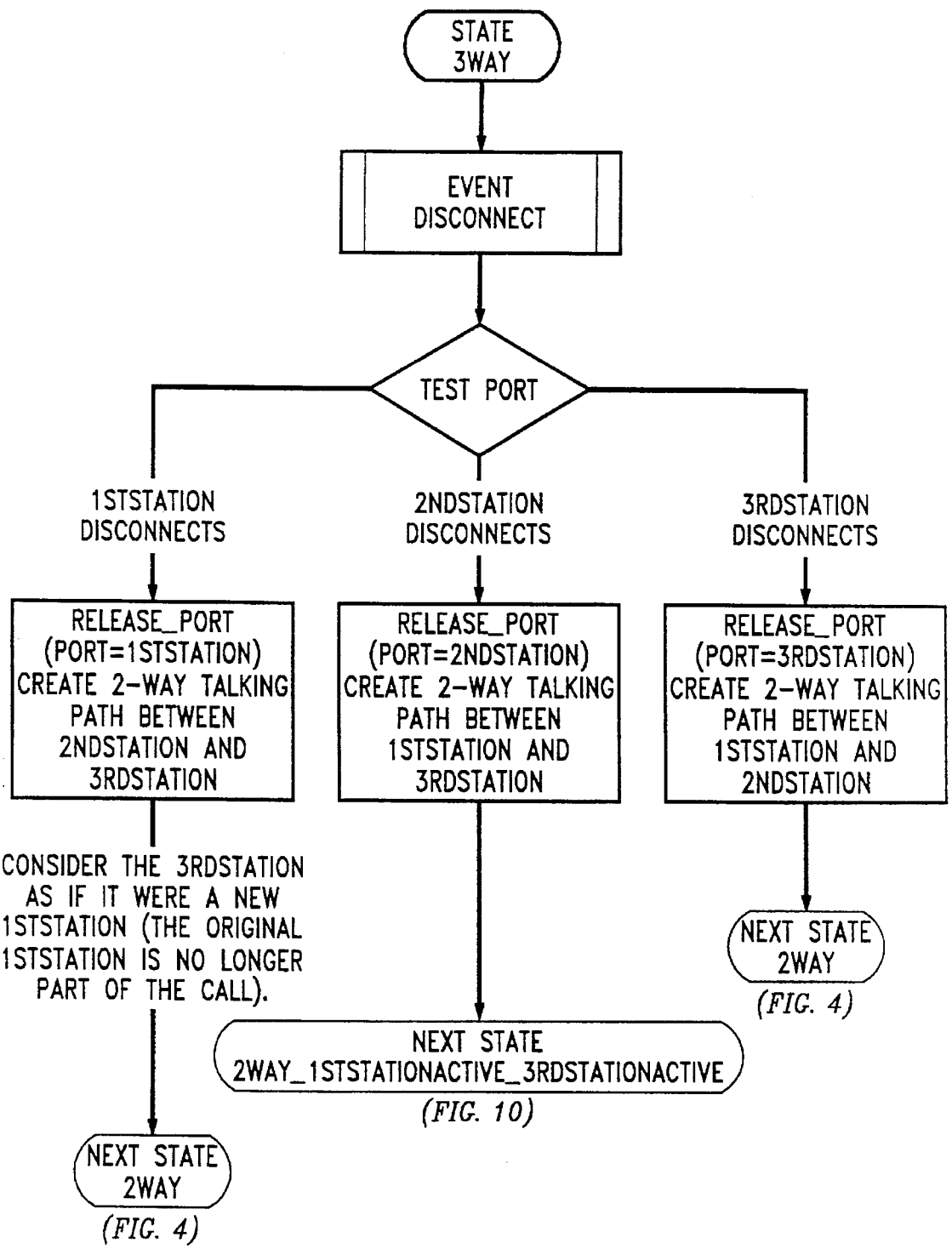

1-7. State 3way (FIG. 9)

In the 3way state, all three stations are connected together in a 3-way conference.

If the 2ndStation disconnects, a 2-way call is created between the 1stStation and the 3rdStation and the state model transitions to state 2way__1stStationActive__3rdStationActive.

If the 1stStation or 3rdStation disconnects, a 2way call is created between the two remaining stations (between the 2ndStation and 3rdStation, or between the 1stStation and 2ndStation, respectively). If 3rdStation disconnects, the state model transitions back to state 2way. If the 1stStation disconnects, the state model transitions to the state 2way, but consider the 3rdStation as if it were the 1stStation (the original 1stStation is no longer part of the call), except of course, the 2ndStation is now the call originator.

Not shown are procedures that allow the 2ndStation (the subscriber who established the 3-way conference) to request the switch to create a 2-way call between the 2ndStation and 1stStation (or between the 2ndStation and 3rdStation), while placing the 3rdStation (or 1stStation) on hold.

1-8. State 2way 1stStationActive 3rdStationActive (FIG. 10)

In this state, the 2ndStation is not part of the call.

Initially, the connection between the 1st and 3rd station is either in a ringing state or in a talking state (depending upon whether or not the 2ndStation disconnected before or after the 3rdStation answered; or in terms of the state model, depending on whether the previous state was 3way__2ndStationActive__3rdStationSetUp or 3way).

Five events are significant:
event no answer received from 3rdStation

If the 3rdStation does not answer, the 1stStation continues to hear tinging until the 1stStation signals a request to return the call to the 2ndStation, or the 1stStation disconnects. No state transition is required.
event answer received from 3rdStation If the 3rdStation answers, then the switch establishes a talking path between the 1stStation and 3rdStation. No state transition is required.
event signal for return to 2ndStation received from 1stStation The 3rdStation is released (disconnected) from call. If the transfer-with-return feature is active, then the state model transitions to the Return Call state; if the feature is not active, then the call is terminated and the 1st station is disconnected.
event signal for return to 2ndStation received from 3rdStation If the transfer-with-return feature is active, then the state model transitions to the Return_Call state; if the feature is not active, then the call is terminated and the 3rd station is disconnected.

event disconnect received from 1stStation or 3rdStation

If the transfer-with-return feature is active, then the state model transitions to the Return_Call state; if the feature is not active, then the call is terminated and the remaining stations are disconnected.

1-9. State Return Call (FIG. 11)

Prior to this state, the 1st or 3rd Station disconnected or signalled a request to reconnect a talking path to the 2ndStation (the service attendant and subscriber in Service 1). In this state, the 2ndStation is sent an information message detailing call history information. This information allows the 2ndStation to separate new calls from return calls, to construct service bills if appropriate, or to send billing information back to the host switch.

If the 1st or 3rd Station has disconnected and the 2ndStation answers, the state model transitions back to the state 2way and a two-way talking path is established between the 2ndStation and the remaining station.

If neither the 1st or 3rd Station has disconnected and the 2ndStation answers, the call to the 2ndStation results in a 3-way call involving the 1st, 2nd, and 3rd Stations and a state model transition to the state 3way.

Please note, the 1stStation can force a disconnect of the 3rdStation by sending the appropriate signal, e.g., a designated DTMF sequence.

Figure 13:
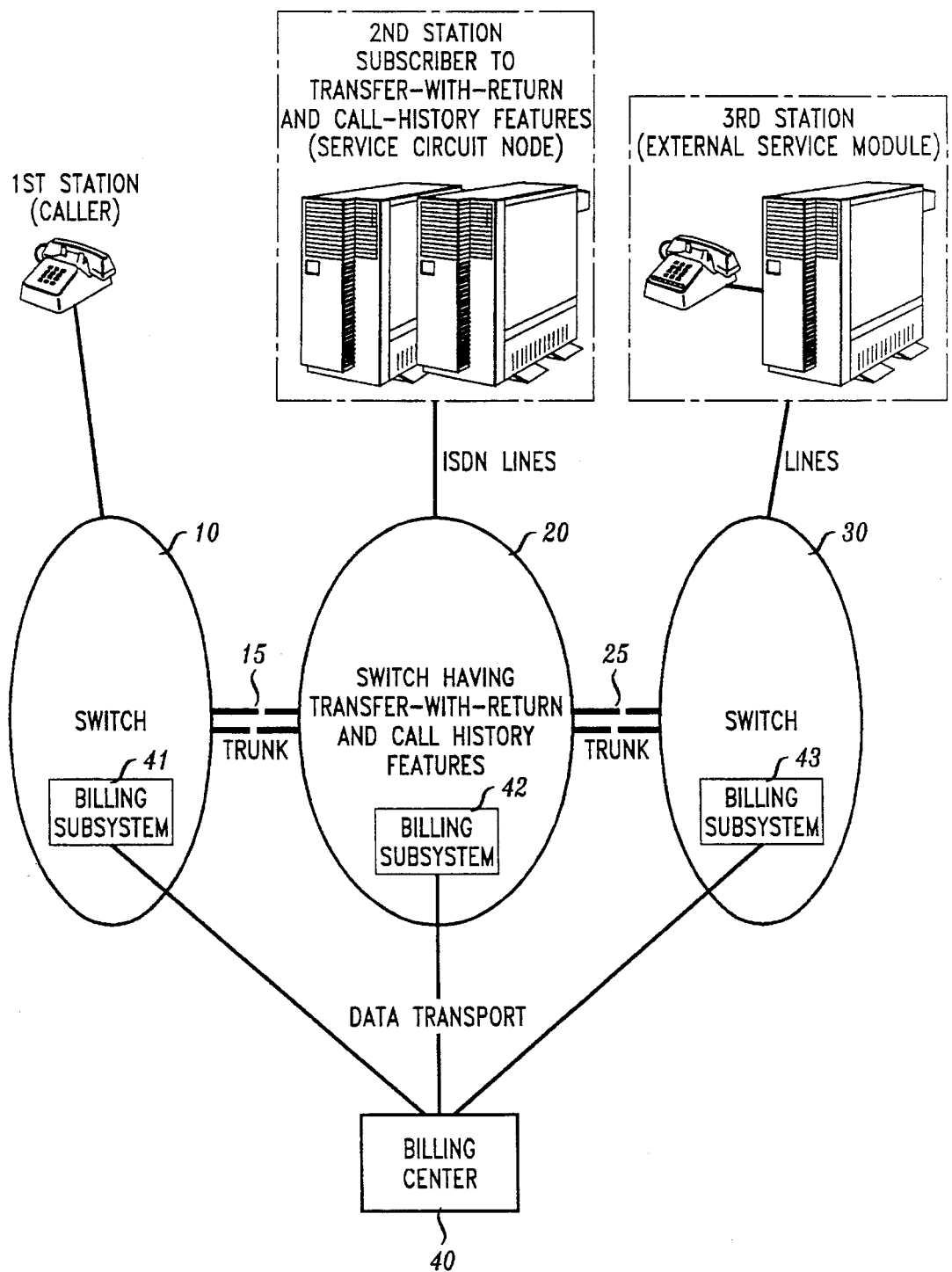
FIG. 13 is a hardware diagram for an arrangement where Service 2 described herein is implemented.
Figure 14:
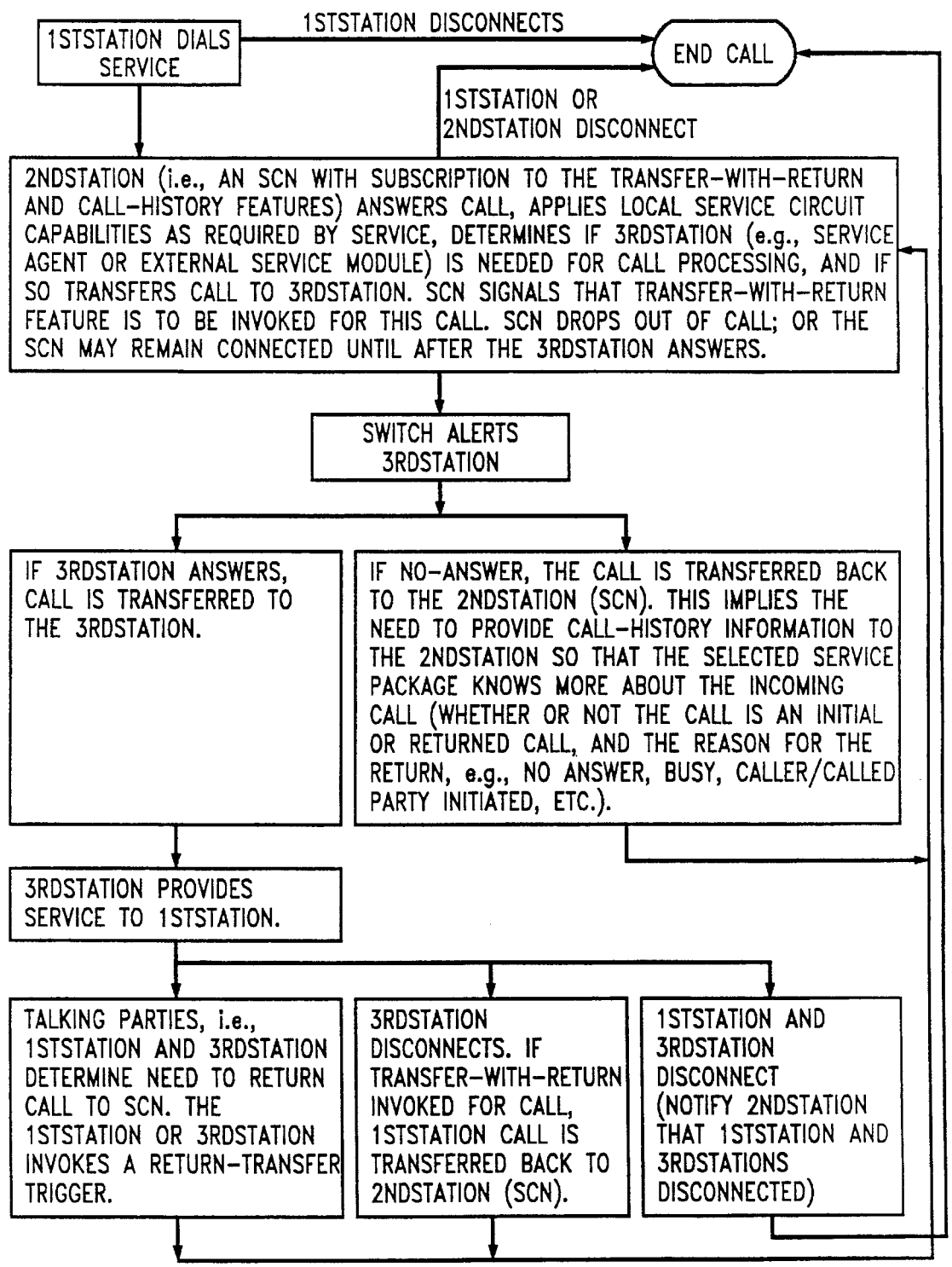
FIG. 14 is a call flow diagram for Service 2.

Service 2: SCN use of Transfer-with-Return feature so that SCN can be information gateway (FIG. 13)

The features detailed in Service 2 are the same as those specified for Service 1:
transfer-with-return feature
return transfer triggers, in particular a call-termination trigger
call-history feature
call-termination notification
In Service 1, these features were demonstrated with a human at each station. In contrast, in Service 2, the human attendant at the 2ndStation is replaced with a Service Circuit Node (SCN).

An arrangement comprising an ISDN switching system 300, a service circuit node 400, and a database 500 is shown in FIG. 39. ISDN switching system 300 is of the type disclosed in U.S. Pat. No. 4,592,048 issued to M. W. Beckner et al. on May 27, 1986. Service node 400 is of the type disclosed in the AT&T A-I-Net™ Service Circuit Node (SCN) System Description and the AT&T A-I-Net™ Service Circuit Node (SCN) Product Technical Specifications Release 1, both of Apr. 15, 1992. System 300 comprises a control arrangement 310, a switching network 320, and line units 330 and is connected to analog station sets 211,212, and 213 as well as other station sets not shown. System 300 is also connected to service node 400 by a number of ISDN basic rate interface (BRI) lines. Service node 400 comprises a control computer 440, a switch fabric 420, and service circuits 430. Service circuits 430 provide the following capabilities: 1) digit collection, 2) tone detection/generation, 3) FAX receipt, storage, and transmittal, 4) voice recording, storage, and playback, 5) text-to-speech (TTS) announcements, 6) call setup through the switch fabric 420, 7) conference bridging, 8) transferring a call to a second party, and 9) returning call control to system 300. Database 500 provides a reverse white pages directory which returns a calling party name when a calling party number is provided. Although not shown in FIG. 39, service node 200 may be connected to a plurality of ISDN switching systems in addition to system 100. System 300 with the transfer-with-return and call history features added, together with SCN 400 are used as switch 20 and the 2ndStation in FIG. 13.

The features illustrated in the call flow of HG. 14 can be used by the SCN (the 2ndStation in these examples) to transfer calls back to a host switch (thus increasing service reliability and decreasing traffic capacity), and then regain call control when the 1 stStation or 2ndStation disconnects (or appropriately signals). These features also allow the SCN to act as an information gateway to a variety of external service modules which are independent and which have no knowledge of the SCN.

This permits several extensions to the basic call flow described earlier:

1. The call could be an in-band or out-of-band data call. This allows the concept to support both voice and data applications.

2. Because many automated systems can operate on multiple concurrent calls, the call flow described previously can be broadened so that the caller (the 1stStation) need not be placed on hold during the conversation between the 2ndStation (in this case, a SCN) and the 3rdStation (i.e., service agent or ESM). Instead the SCN could maintain parallel conversations with the 1stStation and the 3rdStation before establishing a talking path between the 1st and 3rd Stations. When the 1st or 3rdStation requests reconnection to the 2ndStation (i.e. the SCN) the reconnection could either be a conference including all three parties or two separate calls (1stStation to SCN, and SCN to 3rdStation). This option for reconnection may be provisioned at subscription time. In the case of the SCN, the service is provisioned to support reconnection as separate calls, because the SCN could apply its own conference circuits if necessary.

3. Because a SCN is used as the automated attendant, the interactions between caller and SCN could allow services in which the SCN:

plays voice or text-to-speech announcements (e.g., service options);
   collects information that influences service behavior. For example, information might be collected via,
      dtmf digit reception,
      speech recognition,
      speaker verification,
      out-of-band signals from another switching center.
   collects information for storage and subsequent analysis, conversion, or retrieval (i.e., playback), e.g.,
      voice recording/playback
      ascii-to-fax conversion
      facsimile recording/playback
      text-to-speech conversion
   create conferences.

The number of different services supported by an SCN is very large. For example, the SCN may provide an information gateway service in which user choices are communicated. As each choice is recognized, the transfer-with-return procedures executes allowing the user access to the chosen service and to return to the SCN after completing the service transaction.

Feature Descriptions:

A) Transfer with Return

This feature allows the SCN (acting as a 2ndStation, in the current terminology) to call a 1stStation or answer a call from a 1stStation. The SCN may apply a multitude of service circuits to the call (as required by a particular service flow), and eventually may transfer the call to a 3rdStation (possibly an external service module (ESM)). As pan of the transfer procedure, the SCN signals that the call should be returned to the SCN under a variety of conditions.

In addition, if the SCN and the 3rdStations need to communicate call-related data, the data could be transmitted to the 3rdStations either as part of the call-setup or could be sent over a RS232 link, a X.25 network, or through the D-channel on ISDN. An alternative would be to transmit the data via a voice channel prior to transferring the 1stStation call to the 3rdStation.

B) Return Transfer Triggers

Reconnection to the 2ndStation can be triggered in several ways: disconnection by the 1st or 3rd Station, signaling (e.g., flash or DTMF) by the 1st or 3rdStation. If the feature allows the 1 stStations or 3rdStations to signal (e.g., flash or DTMF) reconnection to the 2ndStation, then the transfer-with-return feature can work in conjunction with 3-way calling. The 2ndStation may drop out of the conference and then be asked to come back into the conference. In some cases, a 3rdStation may be an ESM, e.g., a mail system. Some of these ESMs may not provide a method by which a caller can request the ESM to initiate a disconnect. Therefore, to permit the 1stStation to signal a return to the 2ndStation (the SCN) and disconnect the 3rdStation (the ESM) from the call, a call-termination trigger is needed.

C) Call-History on Returned Transfer

As part of the return transfer procedure, the switch alerts the 2ndStation (the SCN) with a call set-up message containing the caller's DN and a transaction_id (possibly the account code). A reason message is provided that specifies the reason for the return, e.g., 3rdStation disconnected, caller-initiated return, etc. The 2ndStation (the SCN) can then process the call using the appropriate customer logic, and determine the call history and billing records from internally stored data. (Note the call-history capability referred to in Service 1 could be provided through an SCN, if all call-transfers return to the SCN, or all call-history records are sent to the SCN).

D) Call-Termination Notification

If the caller disconnects, then a message is sent to the 2ndStation (the SCN), so that the 2ndStation (the SCN) can track service measurements and 3rdStation usage (if this important for the service).

Figure 15:
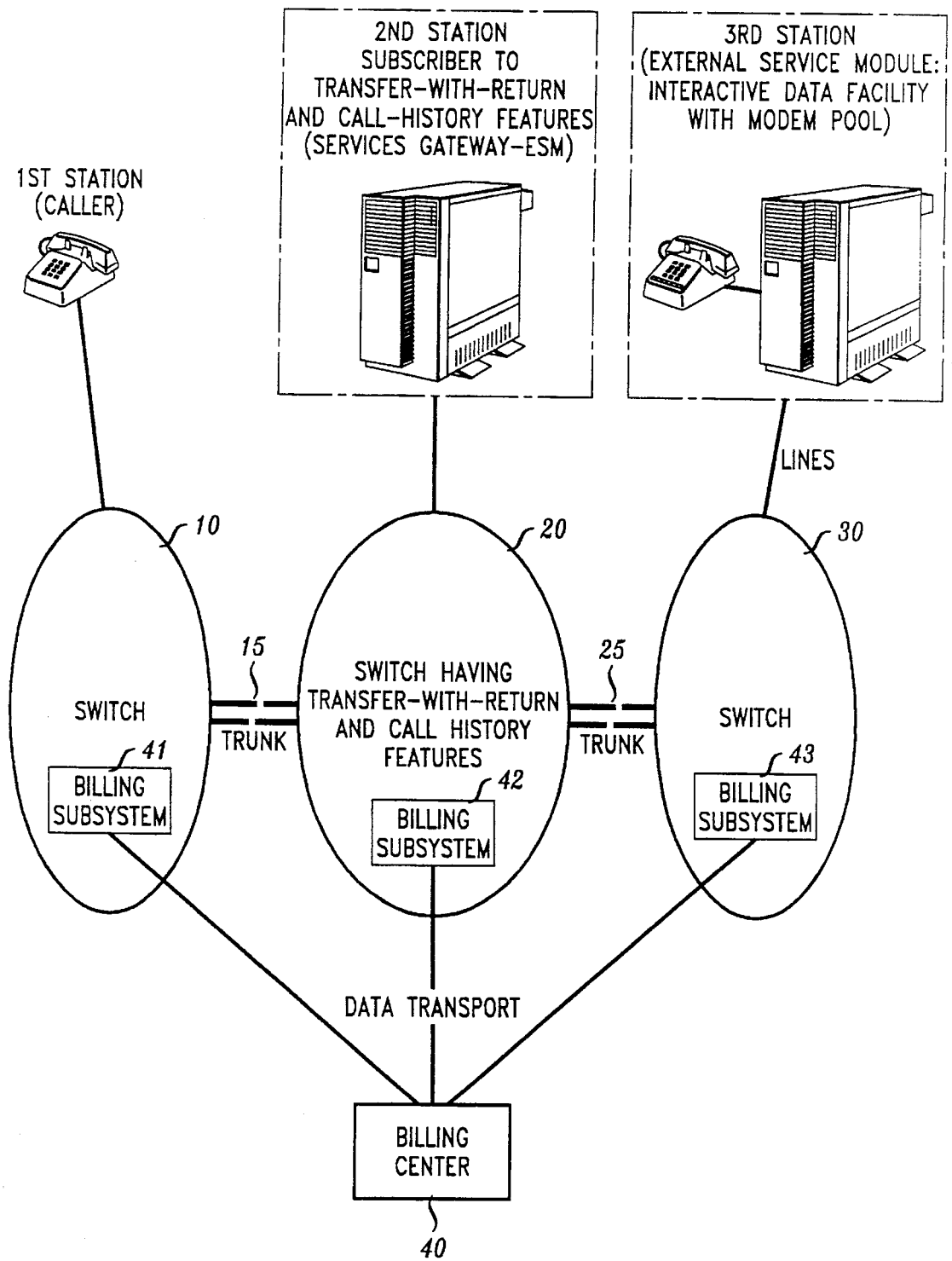
FIG. 15 is a hardware diagram for an arrangement where Service 3 described herein is implemented.

Service 3: ESM use of Transfer-with-Return feature so that ESM can be information & service circuit gateway (FIG. 15)

Figure 16:
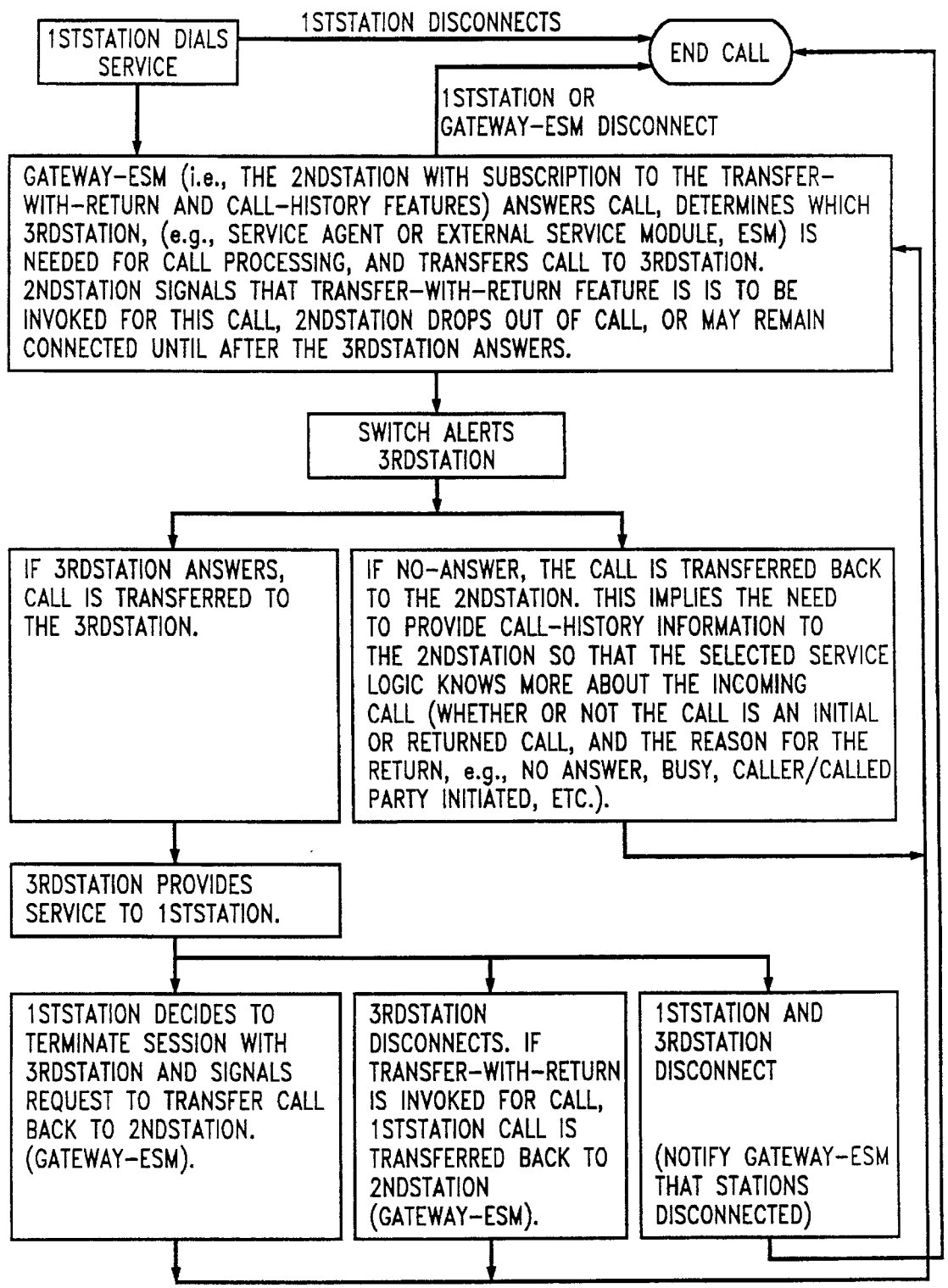
FIG. 16 is a call flow diagram for Service 3.

The features detailed in this service are the same as those specified for Service 1:
transfer-with-return feature
return transfer triggers, in particular a call-termination trigger - call-history feature
call-termination notification In Service 2, the 2ndStation was operated by a Service Circuit Node. In contrast, Service 3 uses a simple external service module (gateway-ESM) as the 2ndStation. The gateway-ESM is capable of concurrently answering multiple calls (by sending the appropriate control message) and transferring them to various locations. There is no need for the gateway-ESM to provide announcement circuits or a switch network. The 3rdStations that receive the transferred calls can be operated by service agents or service-circuit ESMs that provide announcements, record/send voice or facsimile, etc. The call flow is shown in FIG. 16.

Feature Description

A) transfer with return

This feature allows the gateway-ESM (acting as a 2ndStation, in the current terminology) to call a 1stStation or answer a call from a 1stStation. The ESM can only answer and transfer calls to a 3rdStation (possibly a service-circuit or external service module (ESM)). As part of the transfer procedure, the gateway-ESM signals that the call should be returned to the gateway-ESM under a variety of conditions.

In addition, if the gateway-ESM and the 3rdStations need to communicate call-related data, the data could be transmitted to the 3rdStation either as part of the call-setup or could be sent over a RS232 link, a X.25 network, or through the D-channel on ISDN. An alternative would be to transmit the data via a voice channel prior to transferring the 1stStation to the 3rdStation.

B) return transfer triggers

Reconnection to the 2ndStation can be triggered in several ways: disconnection by the 1st or 3rd Station, signaling (e.g., flash or DTMF) by the 1st or 3rdStation. If the feature allows the 1stStations or 3rdStations to signal (e.g., flash or DTMF) reconnection to the 2ndStation, then the transfer-with-return feature can work in conjunction with 3-way calling. The 2ndStation may drop out of the conference and then be asked to come back into the conference. In some cases, a 3rdStation may be an ESM, e.g., a mail system. Some of these ESMs may not provide a method by which a caller can request the ESM to initiate a disconnect. Therefore, to permit the 1stStation to signal a return to the 2ndStation and disconnect the 3rdStation (e.g., a voice mail ESM) from the call, a call-termination trigger is needed.

C) call-history on returned transfer

As part of the return transfer procedure, the switch alerts the 2ndStation (the gateway-ESM) with a call set-up message containing the caller's DN and a transaction_id (possibly the account code). A reason message is provided that specifies the reason for the return, e.g., 3rdStation disconnected, caller-initiated return, etc. The 2ndStation (the gateway-ESM) can then process the call using the appropriate customer logic, and determine the call history and billing records from internally stored data. (Note the call-history capability referred to in Service 1 could be provided through a gateway ESM, if all call-transfers return to the gateway-ESM, or all call-history records are sent to the gateway-ESM).

D) call-termination notification

If the 1stStation disconnects, then a message is sent to the 2ndStation (gateway-ESM), so that the 2ndStation. (the gateway-ESM) can track service measurements and 3rdStation usage (if this important for the service).

Please note, in this scenario, the human attendant is replaced with an automated system. This permits several extensions to the basic call flow described earlier:

1. The call could be an in-band or out-of-band data call. This allows the concept to support both voice and data applications.

2. Because many automated systems can operate on multiple concurrent calls, the call flow described previously can be broadened so that the caller need not be placed on hold during the conversation between the automated attendant (in this case, a ESM) and the third-party (i.e., service agent or another ESM). Instead the automated attendant could maintain parallel connections with the caller and the third party before establishing a talking path between the caller and third party.

Figure 17:
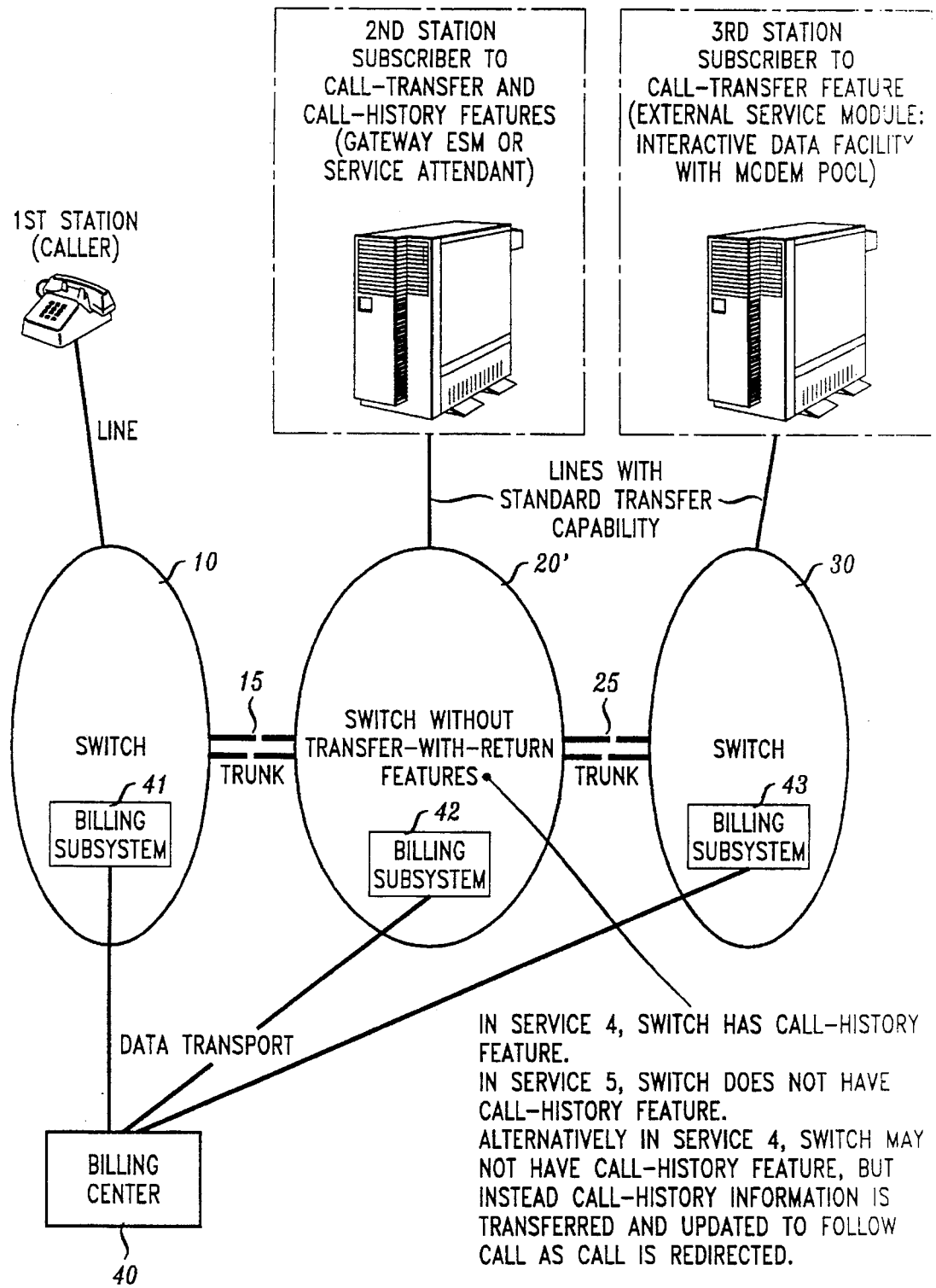
FIG. 17 is a hardware diagram for an arrangement where Services 4 and 5 described herein are implemented.

Service 4: Service gateway without switch-based transfer-with-return capability (FIG. 17)

Figure 18:
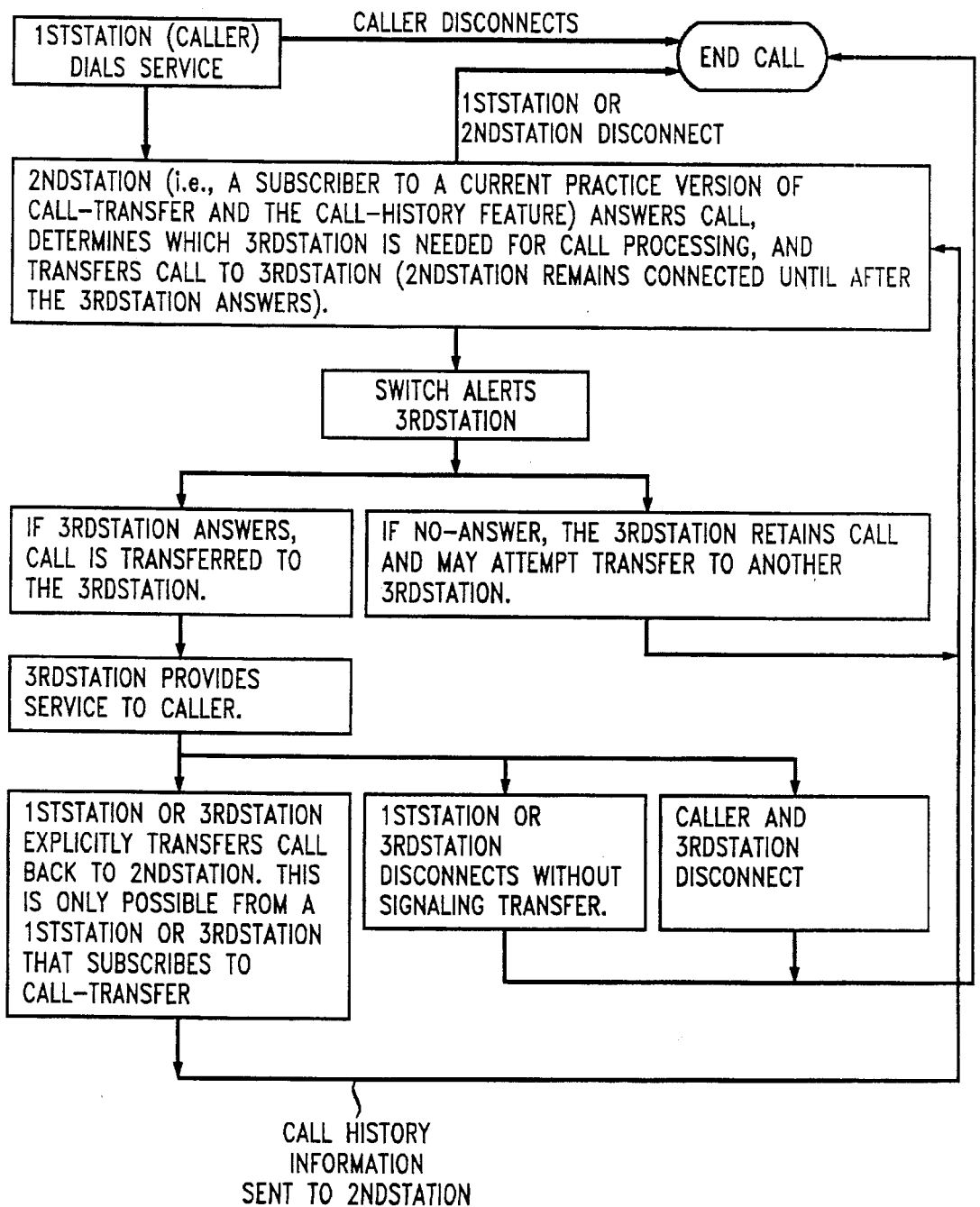
FIG. 18 is a call flow diagram for Service 4.

A networked arrangement of ESMs (or service agents) could have return-transfer and call history features without a switch-based transfer-with-return capability (switch 20') if each ESM knows about the primary ESM (the 2ndStation, in the current terminology), and possibly the other ESMs in the group and each explicitly transferred the call back to the 2ndStation. An exemplary call flow is shown in FIG. 18. A network arrangement of service circuits is provided without modifying existing switches. The described features and logic are not restricted to a network of ESMs, but could be applied equally well to a network external service circuits (ESCs, very similar to an IP, intelligent peripheral) and to a network of telephone users, e.g., a network of service attendants and agents of a company.

Feature Descriptions

A) Providing return-transfer capabilities without the transfer-with-return switch feature If each service provider (each 2nd and 3rd Station) subscribes to call-transfer, then a network of service providers can provide service-circuit based and gateway services without using an SCN and without any new switch features. The 2ndStation (a gateway-ESM or a service attendant) answers the initial call and transfers the call to a 3rdStation (a service provider). The directory number of the 2ndStation is passed to the 3rdStation or this information is stored in a database on the 3rdStation.

In addition, if the 2ndStation and 3rdStation need to communicate additional call-related data, the data could be transmitted to the 3rdStation either as part of the call-setup (if the amount of information was slight; this may mean enhancing the call-setup info package) or over a RS232 link, a X.25 network, or through the D-channel on ISDN. An alternative would be to transmit the data of a voice channel prior to transferring the 1 stStation (the caller) to the 3rdStation.

After the service has been provided by a 3rdStation, the 3rdStation initiates a call transfer back to the 2ndStation which could then transfer the call to another service provider (the equivalent of another 3rdStation).

B) Providing return-transfer triggers without the return-transfer trigger feature Each 3rdStation is responsible for transferring the call back to the 2ndStation upon request by the 1stStation, or as part of the 3rdStation disconnect procedure.

C) Providing call-history feature

As part of the transfer procedure, the switch sends additional call history information and call instructions back to the call-history subscriber that initiated the first transfer procedure.

D) Providing call-termination notification without termination-notification feature If the 1stStation (the caller) disconnects, then the 3rdStation receiving the disconnect signal is responsible for setting up a call to the 2ndStation with call history information, so that the 2ndStation can track service measurements and 3rdStation usage (if this important for the service).

Figure 19:
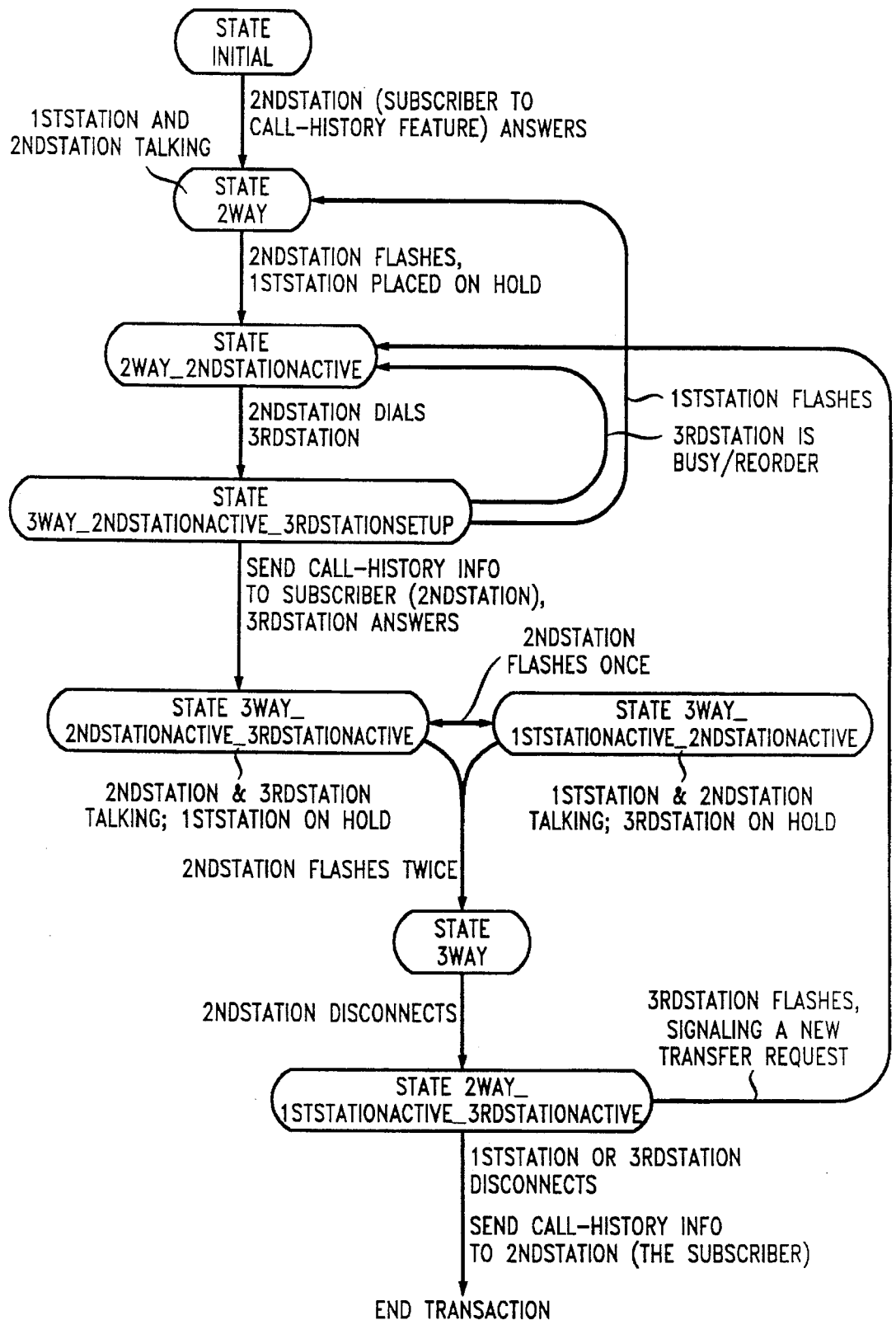
FIG. 19 is a state diagram summarizing transitions between a number of states used to implement the call flow for Service 4.

FIGS. 20–27 provide a state chart model of service 4. FIG. 19 provides a summary of the state transitions.

To improve readability, the following descriptions are partitioned by state. The notation for each state title should be read as: service number-state number, state name, e.g., 4-1. state Initial, indicates that Initial is the name of the first state in the state model describing service 4.

Figure 20:
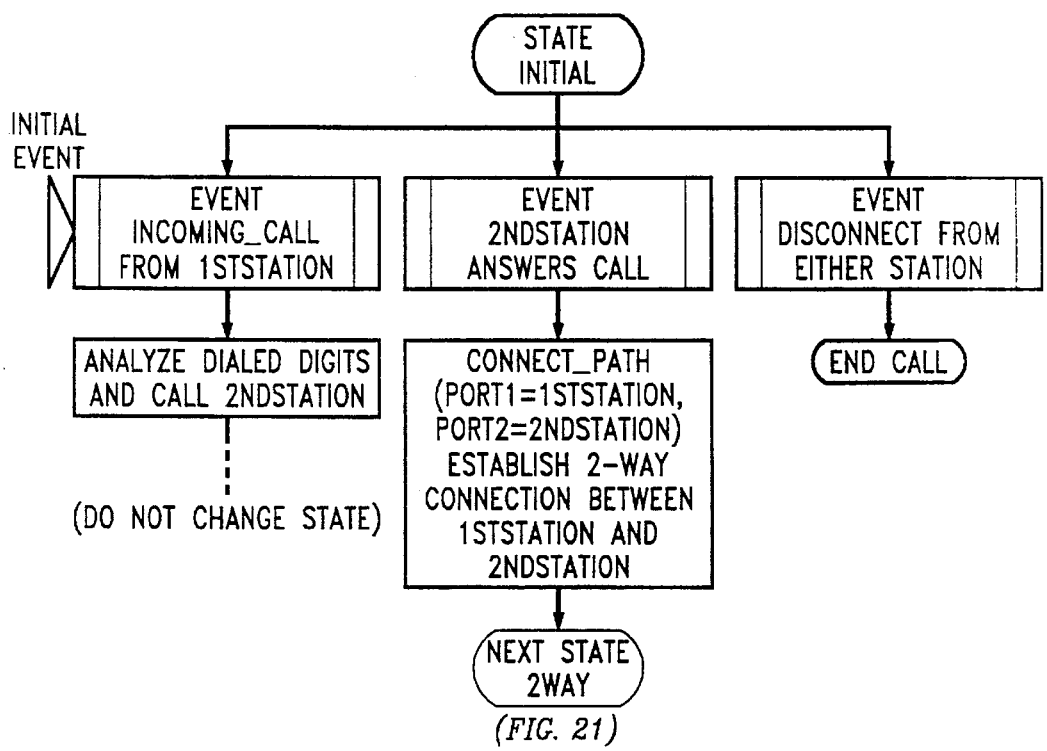
FIGS. 20–27 are action-event diagrams for each of the states of FIG. 19.

4-1. State Initial (FIG. 20)

The call flow begins in the state Initial, with the initial event, Incoming_call. This initial event initiates call processing.

The first action taken in this state is to translate the digits dialed by the 1stStation (i.e., the caller) into a specific directory number, and to then initiate a call-setup to the 2ndStation represented by the dialed directory number.

If the call to the 2ndStation is answered (i.e., an event answered is received from the 2ndStation), then connect 1st and 2nd Stations and transition the state model to another state, 2way.

If the event disconnect is received from either station, then the call ends.

Figure 21:
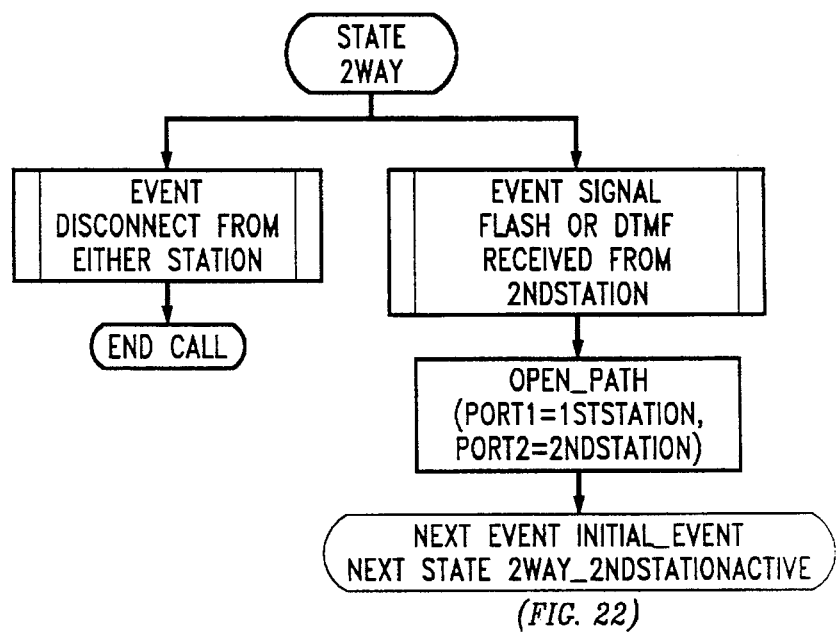

4-2. State 2way (FIG. 21)

If the event disconnect is received from either station, then the call ends.

If the 2ndStation sends an appropriate signal (e.g., a flash or DTMF), and the 2ndStation is a subscriber to the transfer-with-return feature, then the 1stStation is placed on hold, and transition state model to another state, 2way_2ndStationActive.

Figure 22:
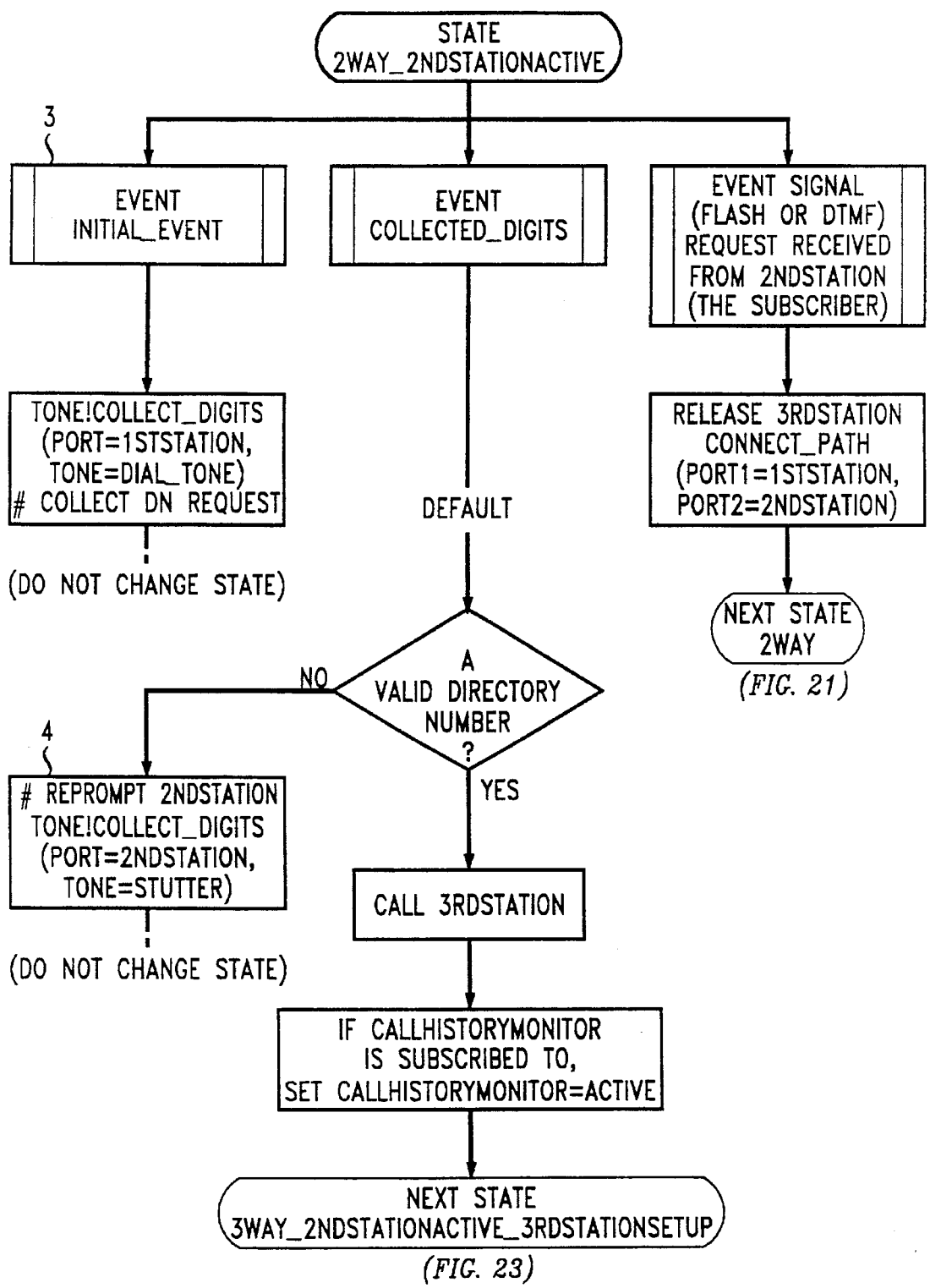

4-3. State 2way 2ndStationActive (FIG. 22)

The 1stStation (caller) is on hold.

Several events are possible in this state:

event Initial Event

The state begins by processing the internally generated event, Initial_Event. Processing this event results in a tone!collect_digits action that delivers a stuttered tone to the 2ndStation. The stuttered tone prompts the 2ndStation for a feature code, one of which is transfer-with-return, another is transfer-without-return (i.e., call-transfer as it is currently done).

event collected digits

The digits signaled by the 2ndStation are received as the event collected_digits. If the collected digits indicate a request for transfer-with-return, a Return_active indicator is set to true. If the transfer-with-return or -without-return feature is requested, then a second tone!collect_digits action delivers dial tone to the 2ndStation. The dial tone prompts the 2ndStation for a directory number. If a valid directory number is received from the 2ndStation, a call-setup procedure is invoked and the state model then transitions to a new state, 3way_2ndStationActive_3rdStationSetUp event signal If the appropriate signal (e.g., a flash) is received by the switch from the 2ndStation, the call is returned to the previous 2-way talking path between the 1stStation and 2ndStation, and state model transitions back to the state 2way.

Figure 23:
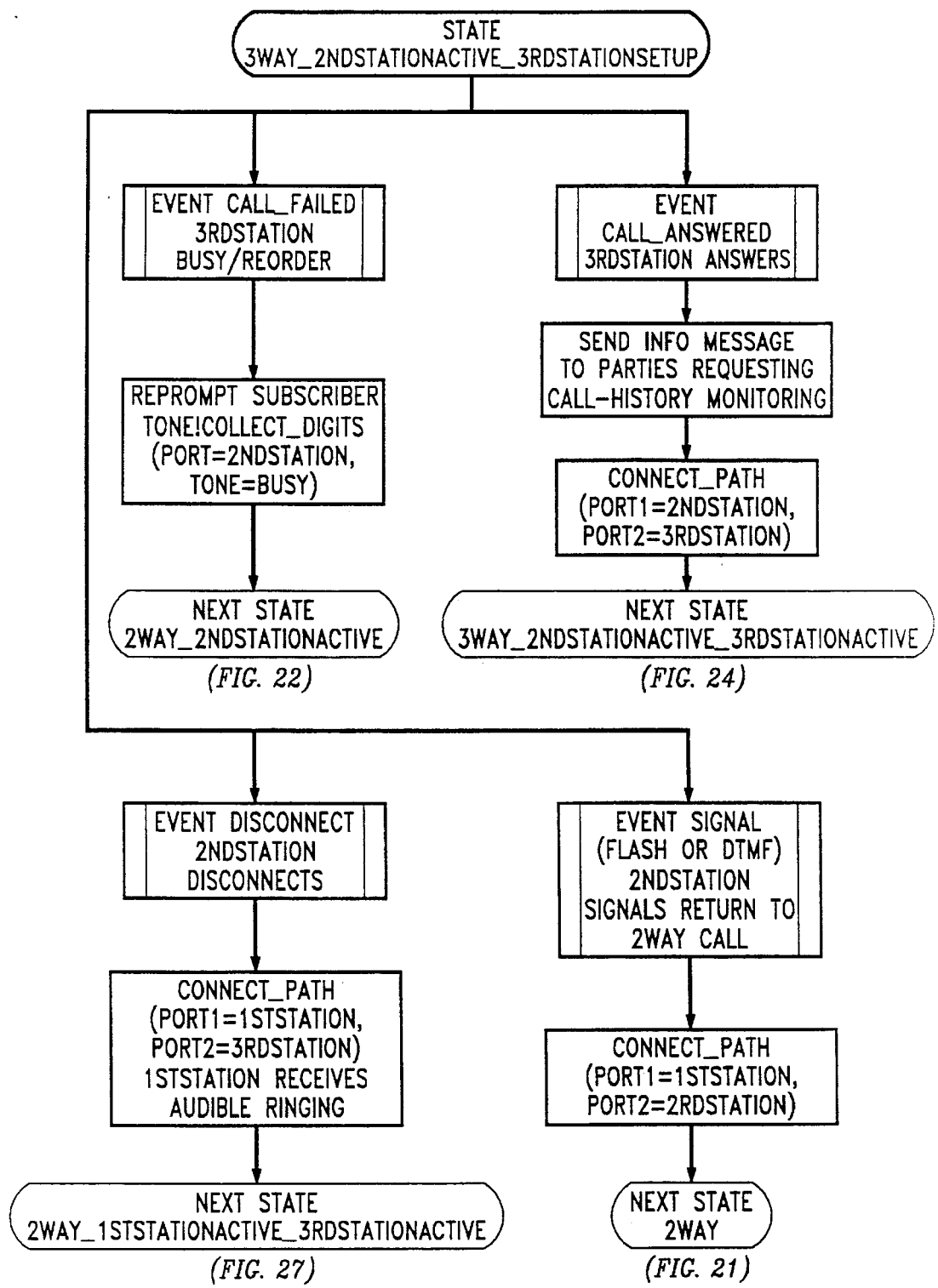

4-4. State 3way 2ndStationActive 3rdStationSetUp (FIG. 23)

The 1stStation is on hold, and the 2ndStation has initiated transfer procedures. Several events are possible in this state:

event call failed

The call could not be connected to the designated directory number, perhaps because the 3rdStation was busy or did not answer. In this event, busy or ringing (as appropriate) is delivered to the 2ndStation. The state model then transitions to state 2way_2ndStationActive.

event call answered

The 3rdStation answers the call. In this case, the switch establishes a 2-way path between the 2nd and 3rd stations. The state model then transitions to an new state, 3way_2ndStationActive_3rdStationActive.

event disconnect received from 2ndStation

The 2ndStation disconnects. In this event, the switch establishes a 2-way connection between the 1stStation and the 3rdStation. Since the 3rdStation has not yet answered, the 1stStation receives audible ringing. The state model then transitions to an new state, 2way_1stStationActive_3rdStationActive.

event signal received from 2ndStation

The 2ndStation (the subscriber) signals (typically, but not necessarily, by flashing) a request to return to the 2-way call with the 1stStation. In this event, a talking path is established between the 1st and 2nd stations, and the state model transitions back to the state 2way.

In the next two states, the 2ndStation has a two-way conversation with either the 1stStation or the 3rdStation. The 2ndStation's signal (flash or DTMF) acts a toggle between these two states. If the 2ndStation signals a conference request, procedures for a 3-way conversation are initiated.

Figure 24:
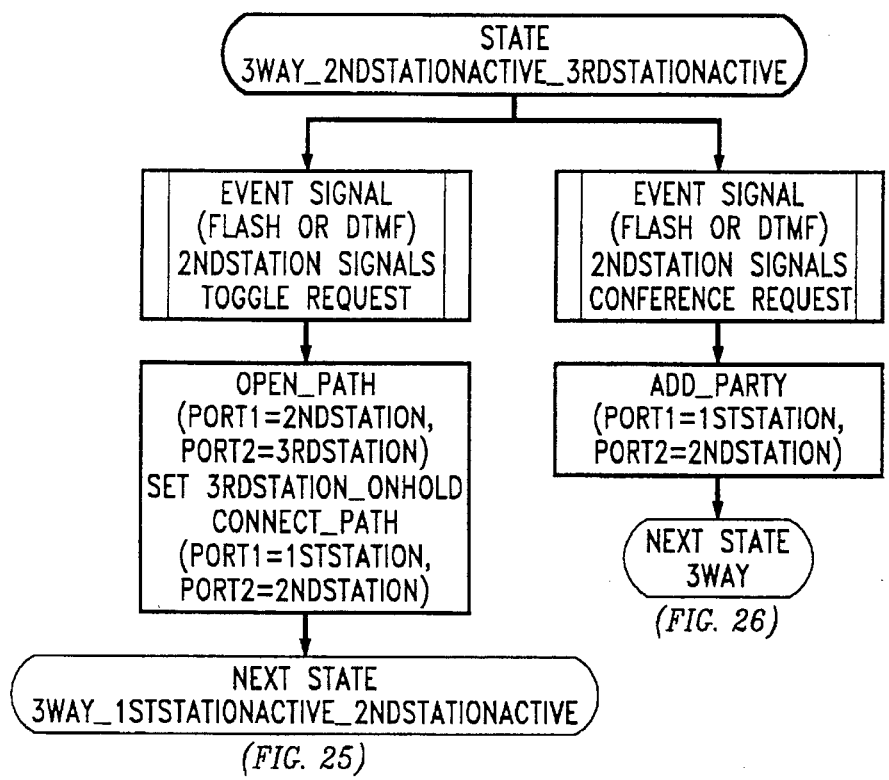

4-5. State 3way 2ndStationActive 3rdStationActive (FIG. 24)

In this state the 1stStation is on hold, while the 2nd and 3rd Stations are connected in a talking path. Two events are significant in this state:

event signal for toggle received from 2ndStation

If the 2ndStation signals a single flash (or some DTMF equivalent) then the switch opens the path between the 2nd and 3rd Stations, and connects a path between the 1st and 2nd Stations. The state model then transitions to a new state 3way_1stStationActive_2ndStationActive.

event signal for conference received from 2ndStation

If the 2ndStation signals a double-flash (or some DTMF equivalent) then the switch creates a 3-way call between the 1st, 2nd, and 3rd Stations. The state model then transitions to a new state 3way.

Figure 25:
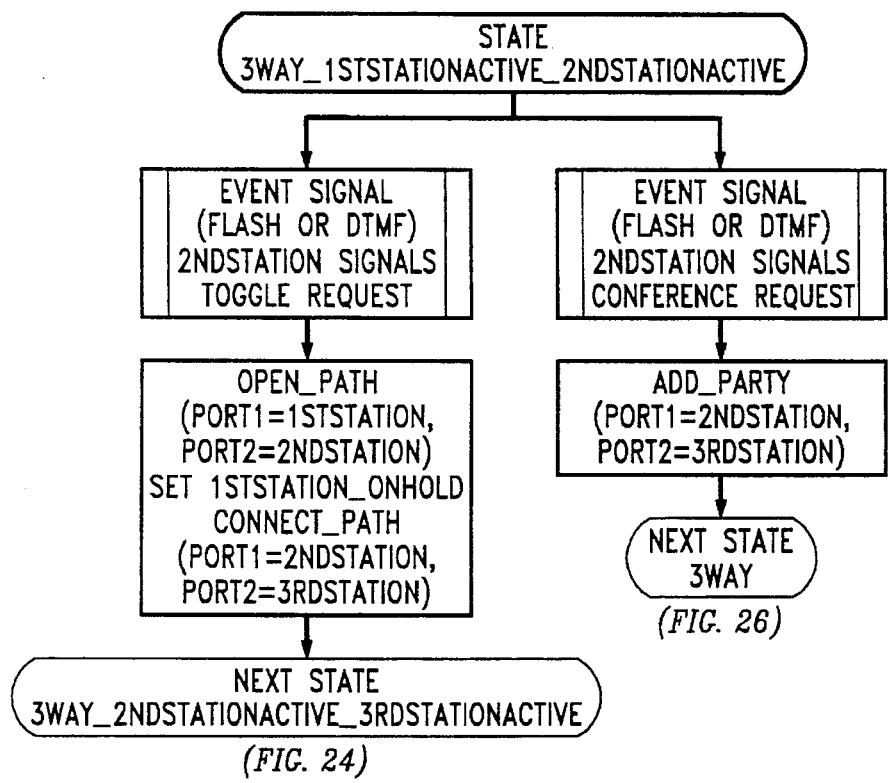

4-6. State 3way 1stStationActive 2ndStationActive (FIG. 25)

In this state the 3rdStation is on hold, while the 1st and 2nd Stations are connected in a talking path. Two events are significant in this state:

event signal for toggle received from 2ndStation

If the 2ndStation signals a single flash (or some DTMF equivalent) then the switch opens the path between the 1st and 2nd Stations, and connects a path between the 2nd and 3rd Stations. The state model then transitions back to the state 3way_2ndStationActive_3rdStationActive.

event signal for conference received from 2ndStation

If the 2ndStation signals a double-flash (or some DTMF equivalent) then the switch creates a 3-way call between the 1st, 2nd, and 3rd Stations. The state model then transitions to a new state 3way.

Figure 26:
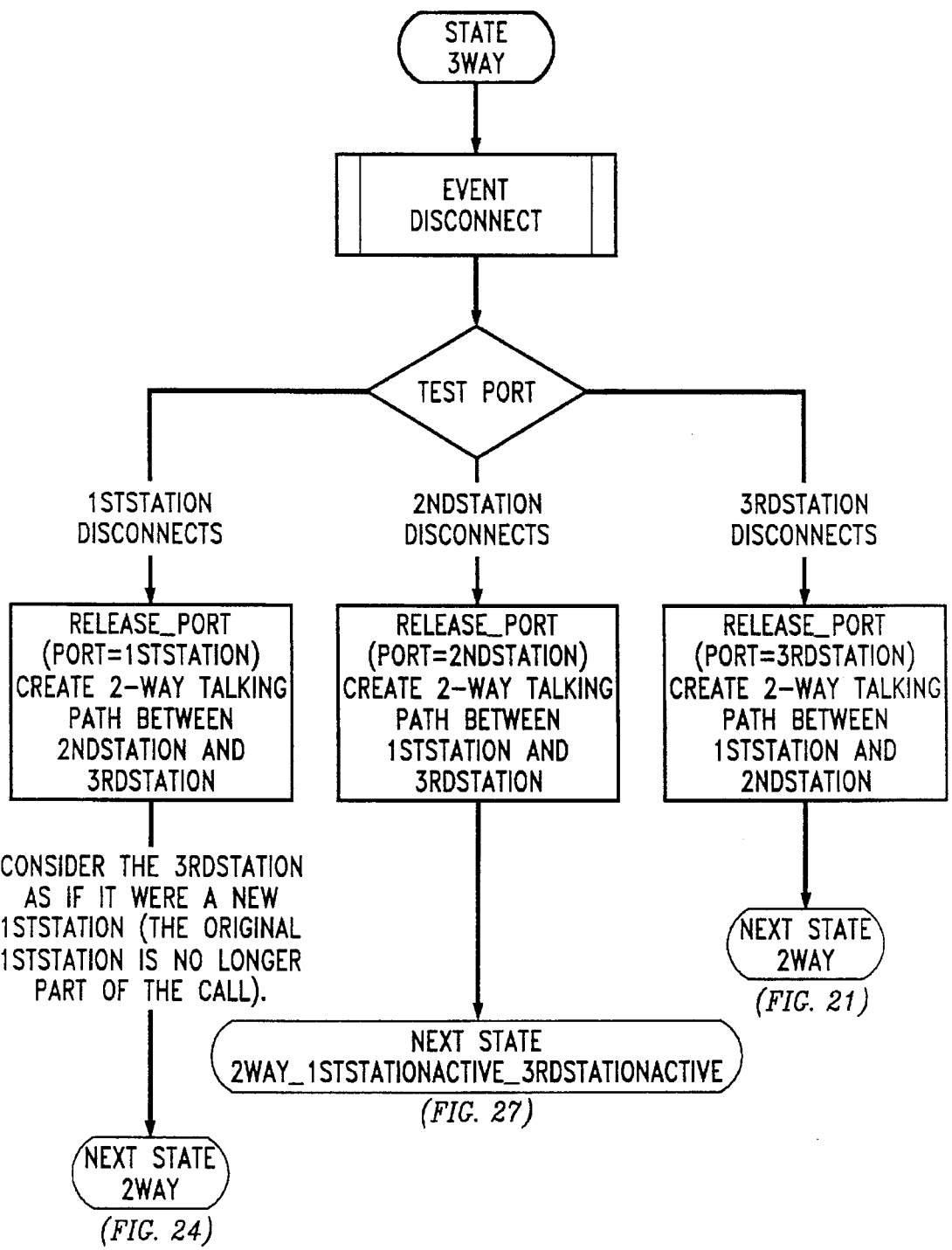

4-7. State 3way (FIG. 26)

In the 3way state, all three stations are connected together in a 3-way conference.

If the 2ndStation disconnects, a 2-way call is created between the 1stStation and the 3rdStation and the state model transitions to state 2way_1stStationActive_3rdStationActive.

If the 1stStation or 3rdStation disconnects, a 2-way call is created between the two remaining stations (between the 2ndStation and 3rdStation, or between the 1stStation and 2ndStation, respectively). If 3rdStation disconnects, the state model transitions back to state 2way. If the 1stStation disconnects, the state model transitions to the state 2way, but consider the 3rdStation as if it were the 1stStation (the original 1stStation is no longer part of the call), except of course, the 2ndStation is now the call originator.

Figure 27:
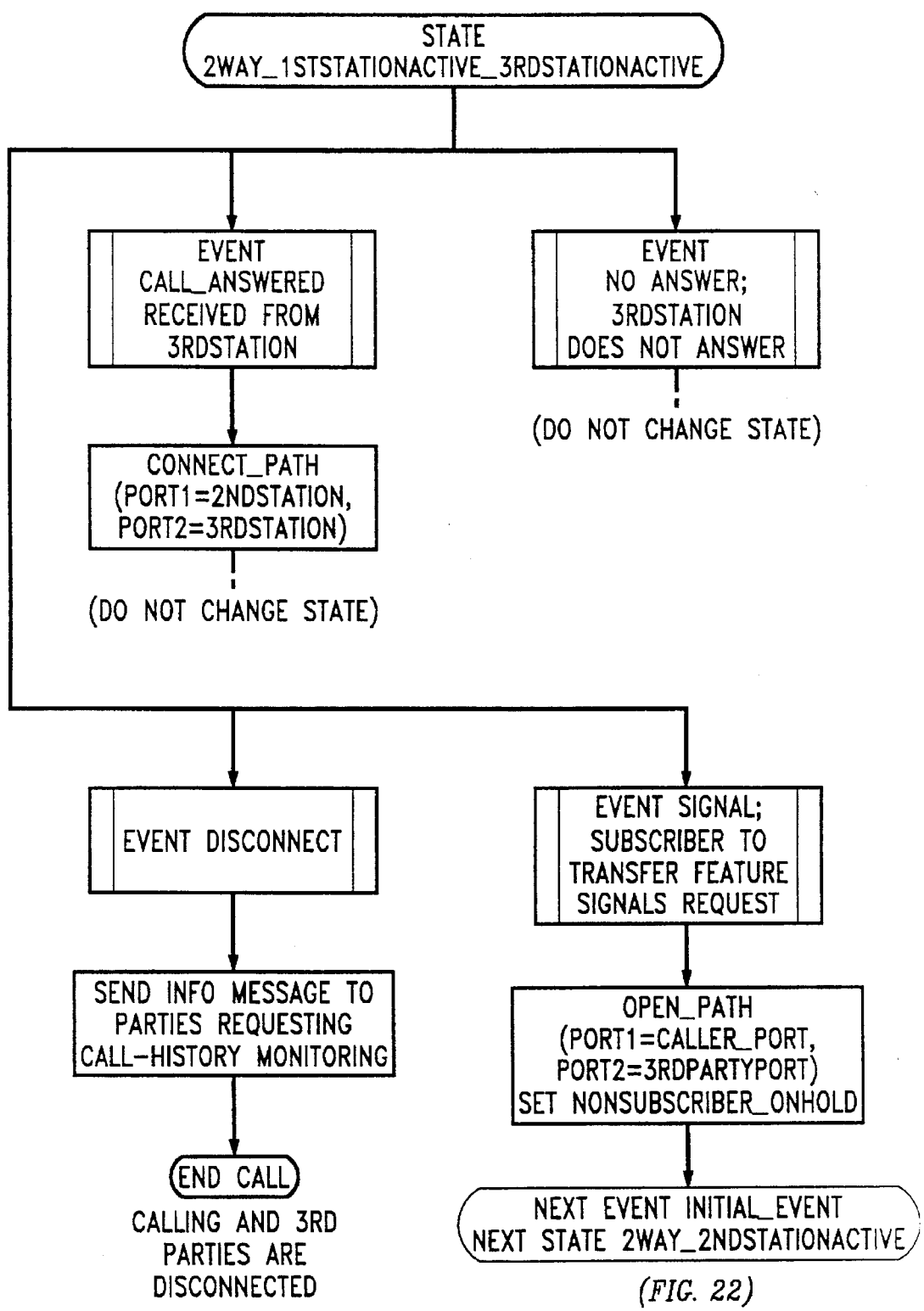

4-8. State 2way 1stStationActive 3rdStationActive (FIG. 27)

In this state, the 2ndStation is not part of the call.

Initially, the connection between the 1st and 3rd station is either in a ringing state or in a talking state (depending upon whether or not the 2ndStation disconnected before or after the 3rdStation answered; or in terms of the state model, depending on whether the previous state was 3way_2ndStationActive_3rdStationSetUp or 3way. If either station disconnects, the call is terminated, and call-history information is returned to the 2ndStation.

Note: In Service Concept-4, the 1stStation and 3rdStation cannot recall the subscriber explicitly by flashing or implicitly by disconnecting. In Service Concept-4, the 3rd party must subscribe to the transfer feature and must independently invoke the transfer back to the initial called party (the subscriber). In effect, in subsequent processing, the 3rd party now becomes the call-transfer subscriber.

Four events are significant:

event no answer received from 3rdStation

If the 3rdStation does not answer, the 1stStation continues to hear ringing until the 1stStation signals a request to return the call to the 2ndStation, or the 1stStation disconnects. No state transition is required.

event answer received from 3rdStation

If the 3rdStation answers, then the switch establishes a talking path between the 1stStation and 3rdStation. No state transition is required.

event disconnect received from 1stStation or 3rdStation

The call is terminated and the remaining stations are disconnected. However, if the call-history feature is active then a call history information message is sent to the station that requested call history information.

event signal (flash or DTMF) received from call-transfer subscriber (e.g., 3rdStation)

If the station that signaled is a call-transfer subscriber, then the call is placed on hold, and the call-transfer subscriber can set up a second call. The state model transitions to state 2way_SubscriberActive (with an initial event, Initial_Event).

Service 5: Service gateway without switch-based transfer-with-return capability and without the call-history feature (FIG. 17)

Service 5 is distinguished from Service 4 by the absence of the call-history feature in Service 5.

Figure 28:
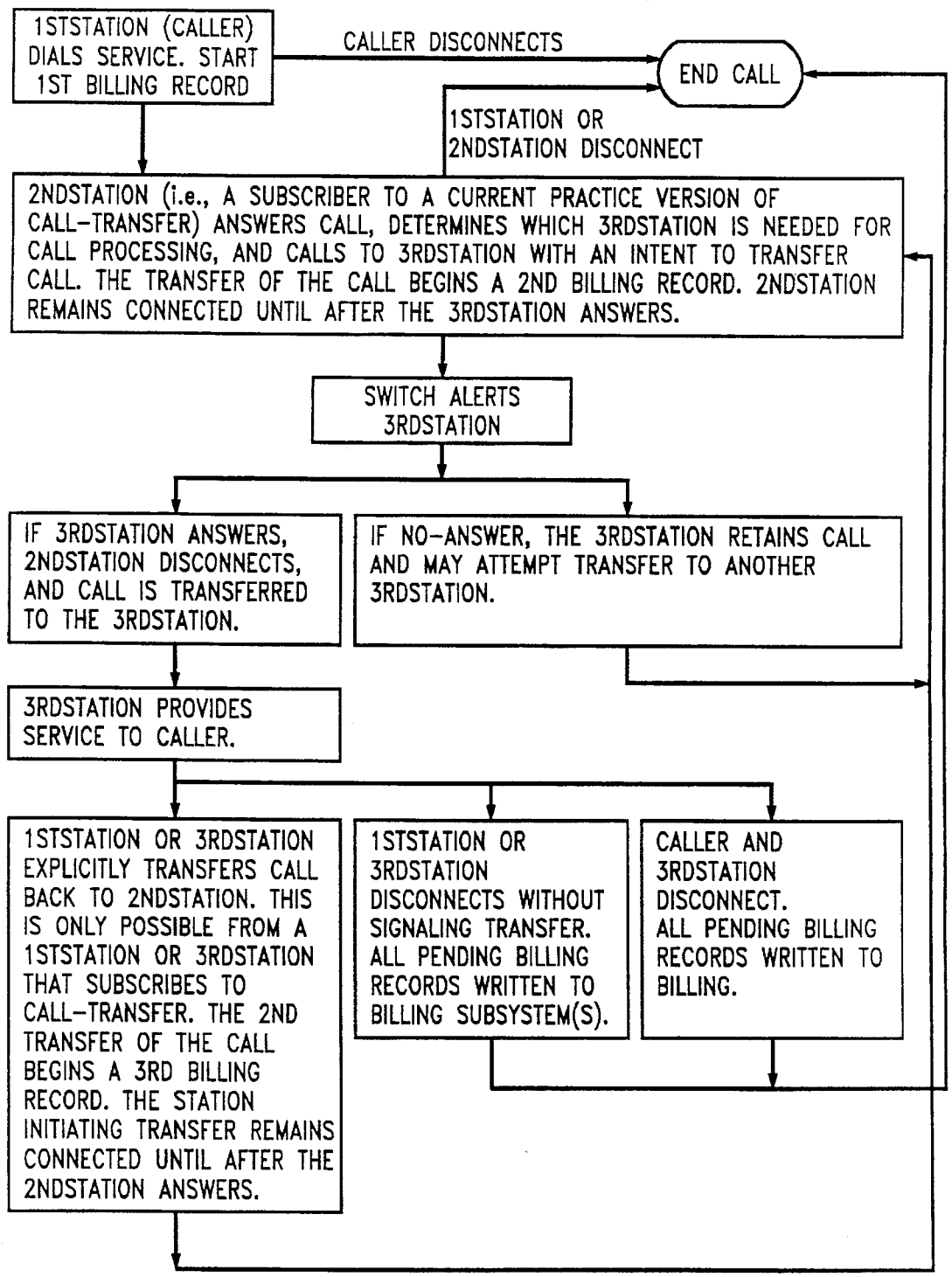
FIG. 28 is a call flow diagram for Service 5.

Consider the case in which a caller (a 1stStation) is connected to a 2ndStation (e.g., a service attendant or external service module) that has line subscription to the current practice call transfer feature. The 2ndStation transfers the call to a 3rdStation (e.g., a service agent or specialist, or another external service module). If the 3rdStation also subscribes to call transfer, the 3rdStation may at the end of the call, transfer the call back to the same 2ndStation that initially handled the call (or routed to a co-worker, if the 2ndStation is busy/no-answer). The call flow is shown in FIG. 28. Two assumptions are made that place this scenario in today's network.

Assumptions:

1. If party A calls Party B, and B transfers the call to Party C, then two calls are concurrently active, even though B has disconnected and A is talking with C. The two calls are the call setup by A, notated here as (A to B), and the call setup by B, notated here as (B to C). Using the terms 1stStation, 2ndStation, and 3rdStation, this means that, in the current telecommunications environment, (1stStation to 2ndStation) is billed to the 1stStation, and (2ndStation to 3rdStation) is billed to the 2ndStation. Moreover, the call (1stStation to 2ndStation) does not terminate when the 2ndStation disconnects, but when the 1stStation or 3rdStation disconnects.

2. The 3rdStation is provided information about the identity of the 2ndStation so that the 3rdStation can redirect the call back to the 2ndStation.

The description of the service concept is structured into two scenarios:

In Scenario A, the 3rdStation terminates the transaction with the 1stStation;

In Scenario B, the 3rdStation transfers the call back to the 2ndStation

Each scenario is further partitioned into two services:

the Bill Correlation Service, in which the separate billing records that are generated by each call (the initial call and each subsequent call-transfer) are correlated and combined into a single billing record.

the Bill Discounting Service, in which particular bills are discounted based upon their association with well-defined criteria (e.g., call-transfers originating from a 2ndStation).

Figure 29:
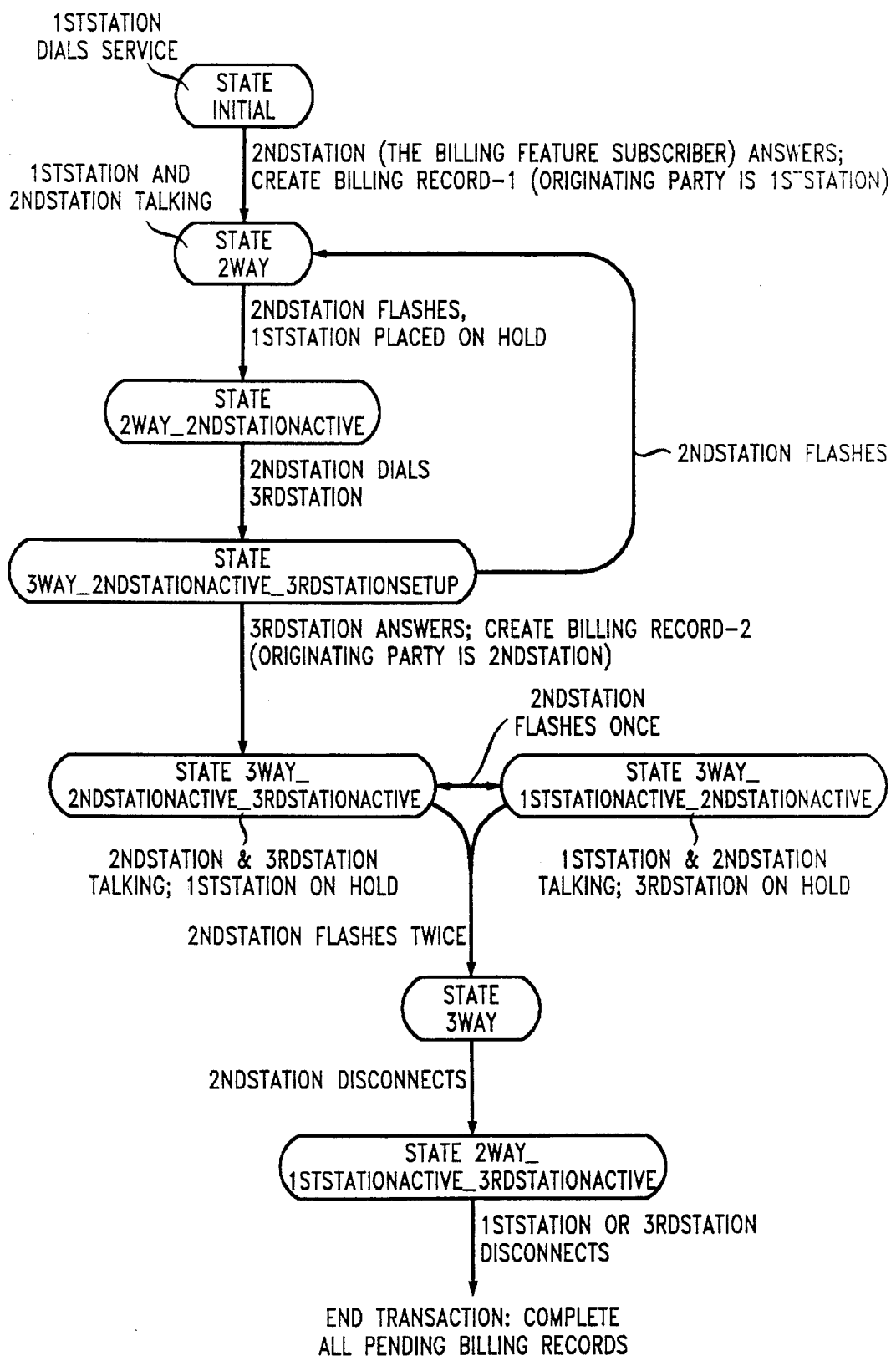
FIG. 29 is a state diagram for Service 5 for an example referred to herein as Scenario A.

Scenario A (FIG. 29)

1. 1stStation dials 2ndStation (or hunt group that terminates to 2ndStation)

2. 2ndStation answers; 1st and 2ndStation talk 3. 2ndStation places call to 3rdStation (if the 2ndStation is a person, this may require first placing the 1stStation on hold)

4. 3rdStation answers; 2ndStation and 3rdStation talk 5. 2ndStation creates 3-way call involving 1stStation, 2ndStation, and 3rdStation 6. 2ndStation disconnects; 1st and 3rd Station talk 7. 1st or 3rd Station disconnect Billing Records:

The billing records created for this scenario are:

a. (1st to 2nd Stations) for network resource usage spanning events (2) through (7)

b. (2nd to 3rd Stations) for network resource usage spanning events (4) through (7)

Assume that all billing records are accessible to the same billing center (or interconnected network of billing centers) for further analysis, and that both types of billing records are applied to the 2ndStation account (as in reverse-charged calls or free phone calls, e.g., 800 calls).

There are two billing and measurement service sets that are provided as an illustration of how new billing and measurement services could be realized using current (or slightly modified) transfer capabilities. These services are applied to the billing records created for each call in the Scenario A call flow. After a discussion of these services in the context of the Scenario A call flow, the same services will be considered in another call flow context, Scenario B. In Scenario B, the transferred-to party, i.e., the 3rdStation, transfers the call back to the initial transferring party, the 2ndStation.

Service Set-5.1, Bill Correlation Service:

Using Scenario A, the Bill Correlation Service provides measurements on transfer operations and provides discount billing services.

Assume that each bill contains:

calling and Terminating DNs, the time at which the call is answered—referred to as Origination Time, the time at which the call is ended—referred to as Termination Time, a call-transfer indication flag that the call involved a call transfer, e.g., in the scenario call (2nd to 3rdStation) involved a call transfer or indicating a call identification.

the time at which the Terminating party disconnects—referred to as the Disconnect Time (the service provider disconnect time). Note, if this statistic is not provided in the billing record, the basic concept described herein is not seriously impacted. It merely means that certain calculations are not performed. In particular, the overlap time referred to herein is not calculated. The overlap time is the duration during which the 2ndStation is conducting two 2-way conversations (and flashing to alternate between talking with the 1stStation and the 3rdStation), or one 3-way conversation.

Bill and Measurements Calculation Method for Service Set-5.1A

1. Search billing records for all calls in which the call-transfer indication is set to true. Such billing records will be referred to as a Transfer-Bills. All other bills are categorized as non-Transfer-Bills. In the present scenario, (1st to 2nd Station) is a non-Transfer-Bill, and (2nd to 3rd Station) is a Transfer-Bill 2. For each non-Transfer-Bill terminating to a subscriber, search the Transfer-Bills for the Transfer-Bill in which:

the subscriber DN is equal to the originating DN of the Transfer-Bill, and the originating time and termination time of the call is subsumed by the originating and terminating times of the call described by the non-Transfer Bill.

Note: the call-transfer indication flag is not essential, it merely reduces the search time for identifying Transfer- and non-Transfer-Bills. Another method is to:

1. locate all bills originating from or terminating to subscribers;

2a. for each bill for a call originating from a subscriber find a bill (if any) in which
the call terminates to that subscriber, and
the origination and termination times subsumes the origination and termination times of the bill originating from the subscriber 2b. for each located pair of bills, the bill for the call originating from the subscriber is a Transfer-Bill, and the call terminating to the subscriber is a non-Transfer-Bill.

3. Create a composite call history with the following information: The format of the following calculations is relation (Billing record), where relation describes a type of information contained in the Billing record, and relation (Billing record) is the value of that information. For example, caller DN (1stStation to 2ndStation) is the directory number of the caller; and Origination Time (1 stStation to 2ndStation) is the time at which the call to 2ndStation was answered. The symbols − and + have their standard arithmetic interpretations. The symbol=may be interpreted as is equal to.

a. Subscriber: caller DN (1st to 2nd Station)
b. Total Duration=Termination Time (1st to 2nd Station)—Origination Time (1st to 2nd Station)
c. Calling Party=caller DN (1st to 2nd Station)
d. Transferring Party=Terminating DN (1st to 2nd Station)=caller DN (2nd to 3rd Station)
e. Transferred-to Party=Terminating DN (2nd to 3rd Station)
f. Call Segment 1: Calling Party and Transferring Party
g. Segment 1 origination time=Origination Time (1st to 2nd Station)
h. Segment 1 duration=Origination Time (2nd to 3rd Station)—Origination Time (1st to 2nd Station)
i. Call Segment 2: Calling Party and Transferred-to Party
j. Segment 2 origination time=Origination Time (2nd to 3rd Station)
k. Segment 2 duration=Termination Time (1st to 2nd Station)—Origination Time (2nd to 3rd Station)
l. Calling Party call duration=Total Duration=Segment1 duration+Segment2 duration
m. Transferring Party call duration=Disconnect Time (1st to 2nd Station) Origination Time (1st to 2nd Station)
n. Transferred-To Party call duration=Segment 2 duration
o. Overlap (two concurrent 2-way calls, and/or one 3-way call involving caller, transferring, and transferred-to parties): Disconnect Time (1 st to 2nd Station)—Origination Time (2nd & 3rd Station)

Figure 30:
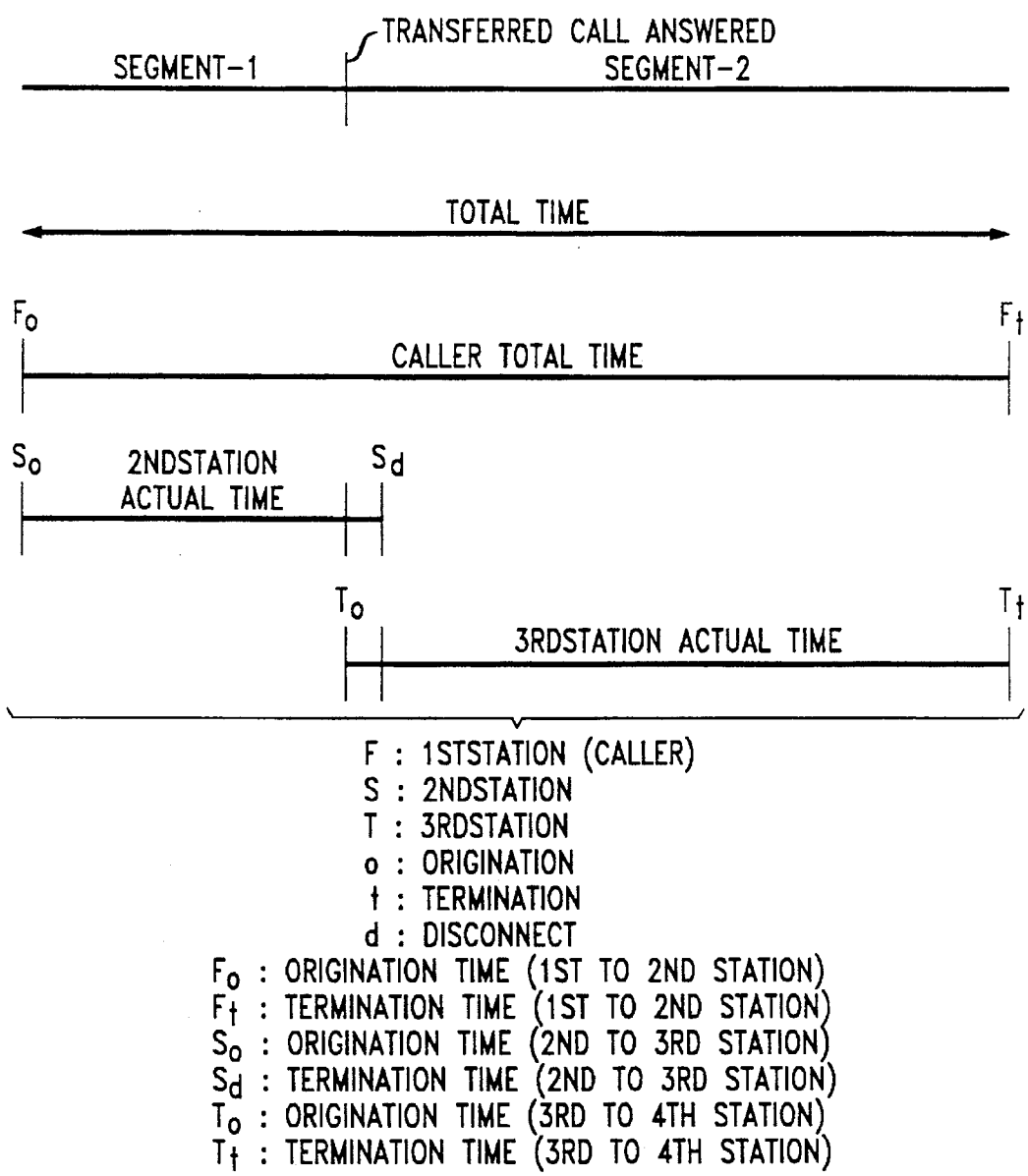
FIG. 30 is an event timing diagram for Scenario A.

The calculations can be visualized as shown in FIG. 30. Refer to Table 1.

TABLE 1

| Segment 1: | originating time = $F_o$ |
| --- | --- |
| | terminating time = $T_o$ |
| Segment 2: | originating time = $T_o$ |
| | terminating time = $T_t$ |
| Overlap between Segments 1 and 2 = $S_d - T_o$ | |
| Caller Total Duration: $F_t - F_o$ | |
| 2ndStation actual Duration: $(S_d - S_o)$ | |
| 3rdStation actual Duration: $(T_t - T_o)$ | |
| current practice, Bill 1: $F_t - F_o$ (originator of call: 1stStation) | |
| current practice, Bill 2: $T_t - T_o$ (originator of call: 2ndStation) | |

4. Use composite call history to derive billing charges

For example, certain subscribers (identified by the originating dn of a Transfer-Bill) who often act as transferring parties may subscribe to billing plans that calculate charges based only on the Calling Party call duration.

Other billing plans for usage charges are also possible, e.g., (Calling Party call duration+Overlap) which would more accurately reflect the number of logical calls in the system and would charge for the amount of time the transferring party is talking to both the caller and the transferred-to party.

A variety of measurements may be derived from the composite call history, especially if the transferred-to parties can be grouped by specialty. For example:

(a.) Number of calls to a particular attendant which are subsequently transferred
(b.) Number of calls to a particular attendant which are subsequently transferred, broken down by the number of calls transferred-to each set of specialists.
(c.) Number of calls transferred to a particular set of specialists
(d.) Average length of overlap per attendant (transferring party)
(e.) Number of calls from a particular geographic region to a particular speciality (i.e., a group of specialists)

Measurement (a) indicates how many calls required additional help from a specialist. Assuming calls are randomly distributed to attendants, Measurement (b) may identify attendants who transfer calls too quickly or who need additional training in particular areas. Measurement (c) could be used to indicate what areas of specialty are frequently beyond the expertise of attendants. This might be used to identify additional educational needs for the attendant community. Measurement (d) indicates the average time needed by an attendant to introduce the caller to a specialist. Attendants with relatively small or large values of measurement (d) may identify attendants with poor communication skills. Outlier values of Measurement (e) might indicate a regional problem in servicing a product, distributing new releases of a product, or regional manufacturing of a product.

Service Set-5.2A, Bill Discounting Service

Using Scenario A, the following is a Bill discounting service that bills for only the call duration used by the caller.

Assume that each billing record contains:
calling and Terminating DNs,
the time at which the call is answered—referred to as Origination Time,
the time at which the call is ended—referred to as Termination Time,
a call-transfer indication flag that indicates that the call involved a call transfer, e.g., the call (2nd to 3rd Station) involved a call transfer.

1. Search billing records for all calls in which the call-transfer indication is set to true. Such billing records will be referred to as a Transfer-Bills. All other bills are categorized as non-Transfer-Bills. In the present scenario, (1 st to 2nd Station) is a non-Transfer-Bill, and (2nd to 3rd Station) is a Transfer-Bill.

2. If the originating dn of a billing record matches a list of preferred subscribers, then discount entire amount of usage charge on that bill. This effectively means that a business customer pays only for usage derived from calls originated by the caller, and not for the internal redirecting of calls from one service provider (attendant or agent or ESM) or another.

Figure 31:
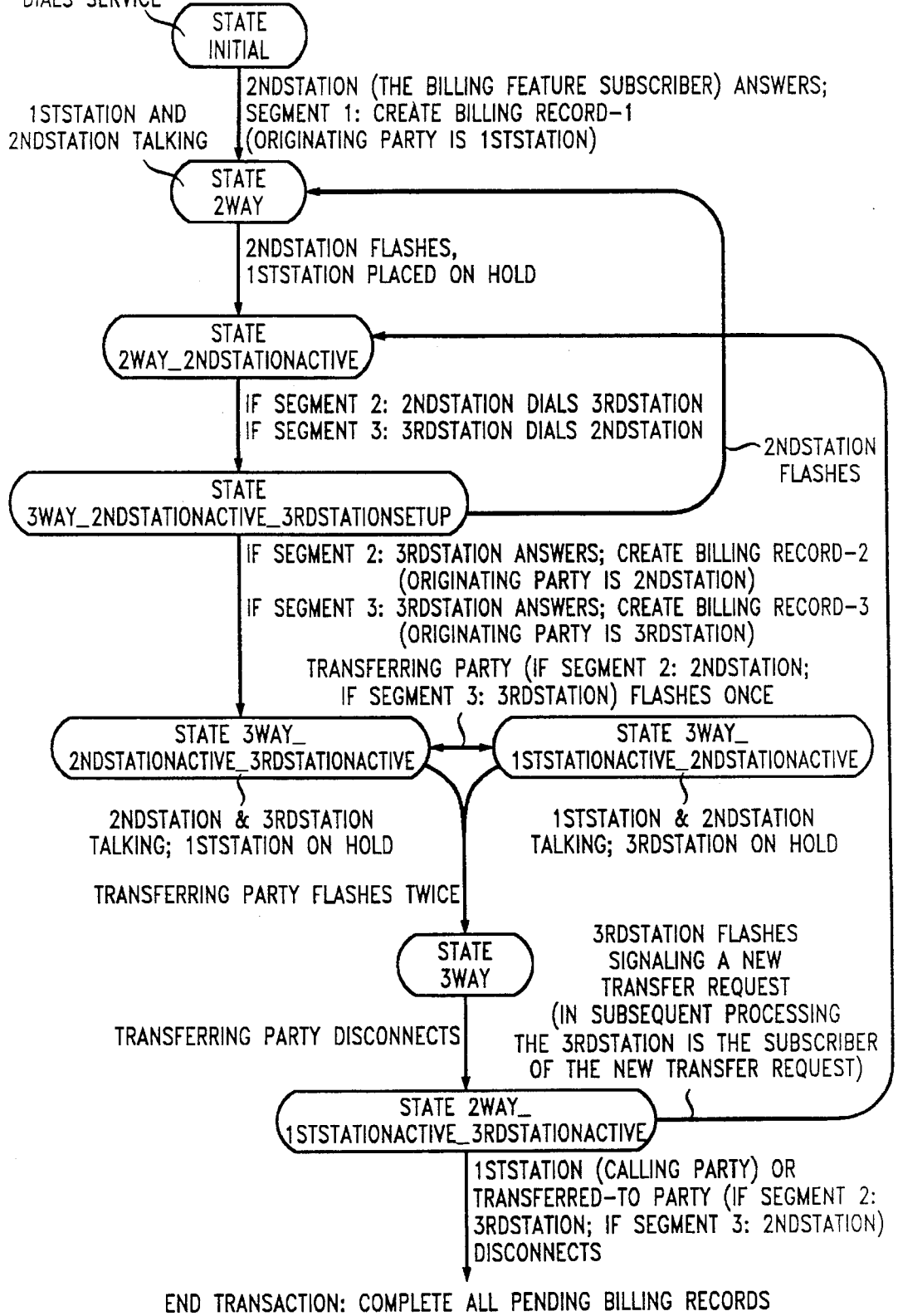
FIG. 31 is a state diagram for Service 5 for an example referred to herein as Scenario B.

Scenario B (FIG. 31)

1. 1stStation calls 2ndStation (or hunt group that terminates to 2ndStation)
2. 2ndStation answers; 1stStation and 2ndStation talk
3. 2ndStation places call to 3rdStation (if the 2ndStation is a person, this may require first placing the 1stStation on hold)
4. 3rdStation answers; 3rdStation and 2ndStation talk
5. 2ndStation creates 3-way call involving 2ndStation, 3rdStation, and 1stStation 6. 2ndStation disconnect; 3rdStation and 1stStation talk 7. 3rdStation places call to 2ndStation (if the 3rdStation is a person, this may require first placing the 1stStation on hold)

8. 2ndStation answers; 3rdStation and 2ndStation talk 9. 3rdStation creates 3-way call involving 2ndStation, 3rdStation, and 1stStation 10. 3rdStation disconnect; 2ndStation and 1stStation talk 11. 2ndStation and 1stStation disconnect The billing records created for this scenario are:

a. (1st to 2nd Station) for network resource usage spanning events (2) through (11)

b. (2nd to 3rd Station) for network resource usage spanning events (4) through (11)

c. (3rd Station to 2nd Station) for network resource usage spanning events (7) through (11)

Assume that all billing records are accessible to the same billing center for further analysis, and that all three types of bills are applied to the 2ndStations account (as in reverse-charged calls or free phone calls, e.g., 800 calls).

Service Set-5.1B: Bill Correlation Service

Using Scenario B, the Bill Correlation Service provides measurements on transfer operations and provides discount billing services.

Assume that each bill contains:
calling and Terminating DNs,
the time at which the call is answered—referred to as Origination Time,
the time at which the call is ended—referred to as Termination Time,
a call-transfer indication flag that the call involved a call transfer, e.g., in the scenario call (2nd to 3rd Station) involved a call transfer.
the time at which the Terminating party disconnects—referred to as the Service Provider Disconnect Time Assume that 2ndStation and 3rdStation are subscribers to the current-practice call-transfer feature and to the Bill Correlation Service.

1. Search billing records for all calls involving at least one subscriber. The resulting set is referred to as the Subscriber set.

2. Search the subscriber set for all calls in which the call-transfer indication is set to true. Such billing records will be referred to as a Transfer-Bills. All other bills are categorized as non-Transfer-Bills. In the present scenario, (1st to 2nd Station) is a non-Transfer-Bill, and (2ndStation to 3rdStation) is a Transfer-Bill.

3. For each non-Transfer-Bill terminating to a subscriber, search the Transfer-Bills for any Transfer-Bill in which:
the subscriber DN of the non-Transfer-Bill is equal to the originating or terminating DN of the Transfer-Bill, and
the originating time and termination time of the call described in the Transfer Bill is subsumed by the originating and terminating times of the call described by the non-Transfer Bill.

Step (3) creates a set of bills containing a non-Transfer-Bill and zero, one, or many Transfer Bills.

4. Create a composite call history with the following information: The format of the following calculations is relation (Billing record), where relation describes a type of information contained in the Billing record, and relation (Billing record) is the value of that information.

For example, caller DN (1stStation to 2ndStation) is the directory number of the caller; and Origination Time (1stStation to 2ndStation) is the time at which the call to 2ndStation was answered. The symbols − and + have their standard arithmetic interpretations. The symbol=may be interpreted as is equal to.

a. Subscriber: caller DN (2nd to 3rd Station)

b. Total Duration=Termination Time (1st to 2nd Station)−Origination Time (1st to 2nd Station)

c. Calling Party=caller DN (1st to 2nd Station)

d. 1stTransferring Party=Terminating DN (1st to 2nd Station)

e. 1stTransferred-to Party=Terminating DN (2nd to 3rd Station)

f. 2ndTransferring Party=Originating DN (3rd to 2nd Station)

g. 2ndTransferred-to Party=Terminating DN (3rd to 2nd Station)

h. Call Segment 1: Calling Party and Transferring Party i. Segment 1 origination time=Origination Time (1st to 2nd Station)

j. Segment 1 duration=Origination Time (2nd to 3rd Station)−Origination Time (1st to 2nd Station)

k. Call Segment 2: Calling Party and Transferred-to Party l. Segment 2 origination time=Origination Time (2nd to 3rd Station)

m. Segment 2 duration=Origination Time (3rd to 2nd Station)−Origination Time (2nd to 3rd Station)

n. Call Segment 3: Calling Party and initial Transferring Party o. Segment 3 origination time—Origination Time (3rd to 2nd Station)

p. Segment 3 duration=Termination Time (1st to 2nd Station)−Origination Time (3rd to 2nd Station)

q. Calling Party call duration=Total Duration=Segment1 duration+Segment2 duration+Segment3 duration r. 2ndStation call duration—[Disconnect Time (1st to 2nd Station)—Origination Time (1st to 2nd Station)]+[Termination Time (3rd to 2nd Station)—Origination Time (3rd to 2nd Station)]

s. 3rdStation call duration=Disconnect Time (3rd to 2ndStation)—Origination Time (2nd to 3rd Station)

t. Overlap between segments 1 and 2 (two 2-way calls, and/or 3 way call involving caller, transferring, and transferred-to parties): Disconnect Time (1st to 2ndStation)—Origination Time (2nd to 3rd Station)

u. Overlap between segments 2 and 3 (two 2-way calls, and/or 3 way call involving 1st, 2nd, and 3rd Stations): Disconnect Time (2nd to 3rd Station) Origination Time (3rd to 2ndStation)

The calculations can be visualized as shown in FIG. 32. Refer to Table 2.

TABLE 2

| | |
|---|---|
| Segment 1: | originating time = $F_o$ |
| | terminating time = $T_o$ |
| Segment 2: | originating time = $T_o$ |
| | terminating time = $S'_o$ |
| Segment 3: | originating time = $S'_o$ |
| | terminating time = $S'_t$ or $F_t$ |
| Overlap between Segments 1 and 2 = $S_d - T_o$ | |
| Overlap between Segments 2 and 3 = $T_d - S'_o$ | |
| Caller Total Duration: $F_t - F_o$ | |
| 2ndStation actual duration: $(S_d - S_o) + (S'_t - S'_o)$ | |
| 3rdStation actual duration: $(T_d - T_o)$ | |
| current practice, Bill 1: $F_t - F_o$ (originator of call: 1ststation) | |
| current practice, Bill 2: $F_t - T_o$ (originator of call: 2ndStation) | |

TABLE 2-continued current practice, Bill 3: $F_t-S'_o$ (originator of call: 3rdStation)

Service Set-5.2B Bill Discounting Service

Using Scenario B, the following describes a Bill Discounting Service that bills for only the call duration used by the caller.

Assume that each billing record contains:
calling and Terminating DNs,
the time at which the call is answered—referred to as Origination Time,
the time at which the call is ended—referred to as Termination Time,
a call-transfer indication flag that indicates that the call involved a call transfer, e.g., in the scenario (2nd to 3rd Station) involved a call transfer.

1. Search billing records for all calls in which the call-transfer indication is set to true. Such billing records will be referred to as a Transfer-Bills. All other bills are categorized as non-Transfer-Bills. In the present scenario, (1st to 2nd Station) is a non-Transfer-Bill, and (2nd to 3rd Station) and (2nd to 3rd Station) are Transfer-Bills.

2. If the originating dn of a Transfer Bill billing record matches a DN on a list of preferred subscribers, then discount entire amount of usage charge on that bill. This effectively means that a business customer pays only for usage derived from calls originated by the caller, and not for the internal redirecting of calls from one service provider (attendant or agent or ESM) to another.

Note: the call-transfer indication flag is not essential, it merely reduces the search time for identifying Transfer- and non-Transfer-Bills. Another method is to:

1. locate all bills originating from or terminating to subscribers;

2a. for each bill for a call originating from a subscriber find a bill (if any) in which—the call terminates to that subscriber, and—the origination and termination times subsumes the origination and termination times of the bill originating from the subscriber 2b. for each located pair of bills, the bill for the call originating from the subscriber is a Transfer-Bill, and the call terminating to the subscriber is a non-Transfer-Bill.

Description of Prior Art Billing Service (FIG. 33)

Call transfer in a centrex or ISDN environment allows subscribers to receive or originate a call, receive or originate a second call concurrent with the first call, join the two calls together into a 3-way call, and disconnect from the call while allowing the other two parties to continue talking. A state diagram and call flow are shown in FIGS. 34 and 35.

Terminology

The following scenario will consider call-transfer from the perspective of a 2ndStation that receives a call from a 1stStation, and transfers that call to a 3rdStation, yielding a conversation between the 1stStation and the 3rdStation (the 2ndStation has disconnected). In standard telecommunications terminology the 1stStation is frequently called the calling party, the 2ndStation is typically referred to as the transferring party, and the 3rdStation is often called the transferred-to party.

Network Routing

In current practice, a transferred call is routed from the switching office of the 1stStation (termed the 1stSwitch) to the 2ndSwitch to the 3rdSwitch, even after the 2ndStation has disconnected.

Billing Practices

In current practice, the originating switch of the first call produces a bill that is handled independently from the bill generated by the originating switch of the second call (even if the same switch is involved for both call originations).

Each originated call generates a billing record.: the call from the 1stStation to the 2ndStation; the call from the 2ndStation to the 3rdStation. Both calls terminate when the 1stStation or 3rdStation disconnect. The billing practice does not reflect the time at which the 2ndStation disconnects.

If the 3rdStation were to initiate a 3rd call (a second transfer) while talking with the 1stStation, then a third bill would be created for the call from the 3rdStation to the 4thStation (the 4thStation may be equivalent to the 2ndStation if the 3rdStation transfers the call back to the 2ndStation). In this case, all three bills would depend upon the disconnect time of the 1st or 4thStation (and would not reflect the disconnect times of the 2nd or 3rdStations). Event diagrams for Scenario A are shown in FIGS. 36 and 37. An event diagram for Scenario B is shown in FIG. 38. Refer to Table 3 for Scenario A and Table 4 for Scenario B.

TABLE 3

| Segment 1: | originating time = $A_0$ |
|---|---|
| | terminating time = $C_0$ |
| Segment 2: | originating time = $C_0$ |
| | terminating time = $C_1$ |
| Billing Practice: | | current practice, Bill 1: $A_t-A_0$ (originator of call: 1stStation)
bill based on tariff for 1stStation to 2ndStation calls;
bill generated by 1stSwitching office;
bill produced when 1stStation or 3rdStation disconnect
current practice, Bill 2: $C_t-C_0$ (originator of call: 2ndStation)
bill based on tariff for 2ndStation to 3rdStation calls;
bill generated by 2ndSwitching office;
bill produced when 1ststation or 3rdStation disconnect
No bill created based on 1stStation to 3rdStation distance.
Bill for second call not dependent upon 2ndStation disconnect.

TABLE 4

| Segment 1: | originating time=$A_0$ |
|---|---|
| | terminating time=$C_0$ |
| Segment 2: | originating time=$C_0$ |
| | terminating time=$B'_0$ |
| Segment 3: | originating time=$B'_0$ |
| | terminating time=$B'_t$ or $A_t$ |

Overlap between Segments 1 and 2 = $B_d-C_0$
Overlap between Segments 2 and 3 = $C_d-B'_0$
Caller Total Duration: $A_t-A_0$
2ndStation actual duration: $(B_d-B_0) + (B'_t-B'_0)$
3rdStation actual duration: $(C_d-C_0)$
current practice, Bill 1: $A_t-A_0$ (originator of call: 1stStation)
current practice, Bill 2: $A_t-C_0$ (originator of call: 2ndStation)
current practice, Bill 3: $A_t-B'_0$ (originator of call: 3rdStation)

A further alternative method used in the arrangement of FIG. 40 includes connecting a call from a first station to a second station. Contemporaneously with connecting the call to the second station, the transmission of first call segment event messages is initiated to a billing center, e.g., a nationwide billing center. The call is then connected to a third station. Contemporaneously with connecting the call to the third station, the transmission of second call segment event messages is iniatiated to the same billing center. After all of the first and second call segment event messages have been transmitted, the billing center correlates them to generate a single billing record for use in billing the call.

It is to be understood that the above-described embodiments are merely illustrative of the principles of the invention and that many variations may be devised by those skilled in the art without departing from the spirit and scope of the invention. It is therefore intended that such variations be included within the scope of the claims.

I claim:

1. A call processing and billing method comprising connecting a call from a first station to a second station, contemporaneously with said connecting of said call to said second station, initiating a first billing record for said call, connecting said call to a third station, contemporaneously with said connecting of said call to said third station, initiating a second billing record for said call, completing said first and second billing records proximate to the end of said call, said first billing record reflecting a first time duration and said second billing record reflecting a second time duration, delivering said first and second billing records to a common billing center, correlating said first and second billing records to generate a single billing record such that said single billing record reflects a resultant time duration different from the sum of said first and second time durations, and establishing a charge for said call dependent on said resultant time duration.

2. A method in accordance with claim 1 where said connecting of said call to said third station comprises conferencing said third station into said call.

3. A method in accordance with claim 1 where said connecting of said call to said third station comprises transferring said call to said third station.

4. A method in accordance with claim 3 where said transferring of said call to said third station comprises connecting one of said first and second stations with said third station for an initial two-way consultation and thereafter connecting the other of said first and second stations with said third station for two-way consultation.

5. A method in accordance with claim 3 where said transferring of said call to said third station includes initially connecting said first, second and third stations for a conference.

6. A method in accordance with claim 3 where said transferring of said call to said third station comprises without having previously connected one of said first and second stations with said third station for an initial two-way consultation, connecting the other of said first and second stations with said third station for two-way consultation.

7. A method in accordance with claim 1 where said correlating comprises modifying one of said first and second billing records using information from the other of said first and second billing records to generate said single billing record.

8. A method in accordance with claim 1 where said correlating comprises combining information from said first and second billing records to generate said single billing record.

9. A method in accordance with claim 1 where said correlating comprises using information from only one of said first and second billing records to generate said single billing record.

10. A method in accordance with claim 9 where only one of said first and second billing records is used as said single billing record.

11. A method in accordance with claim 1 further comprising including an identifier, in at least one of said first and second billing records, for use in said correlating.

12. A method in accordance with claim 1 further comprising connecting said call to a fourth station, and contemporaneously with said connecting of said call to said fourth station, initiating a third billing record for said call, where said correlating comprises correlating said first, second and third billing records to generate said single billing record.

13. A method in accordance with claim 1 wherein delivering said first and second billing records includes transmitting call segment event messages to said common billing center said common billing center utilizing said call segment event messages to generate said single billing record.

14. A method in accordance with claim 1 further comprising subsequent to connecting said call to a said third station, disconnecting said first station from said call, transferring said call back to said first station, contemporaneously with said transferring of said call back to said first station, initiating a third billing record for said call, and where said correlating includes correlating said first, second and third billing records to generate said single billing record for use in billing said call.

15. A method in accordance with claim 14 where said transferring of said call back to said first station comprises automatically returning said call to said one station in response to a prespecified event without receiving a dialed number for said one station.

16. A method in accordance with claim 15 where said prespecified event is receiving disconnect signaling from only one of said other and third stations.

17. A method in accordance with claim 15 where said prespecified event is receiving predefined signaling from one of said other and third stations.

* * * * *